(12) United States Patent
Rosenthal et al.

(10) Patent No.: US 8,507,836 B1
(45) Date of Patent: Aug. 13, 2013

(54) SOFTWARE DEFINED LENSING

(76) Inventors: Eric Dean Rosenthal, Morganville, NJ (US); Richard Jay Solomon, Monson, MA (US); Jonathan M. Smith, Princeton, NJ (US); Clark Eugene Johnson, Madison, WI (US)

( * ) Notice: Subject to any disclaimer, the term of this patent is extended or adjusted under 35 U.S.C. 154(b) by 0 days.

(21) Appl. No.: 13/506,649

(22) Filed: May 7, 2012

Related U.S. Application Data

(60) Provisional application No. 61/685,532, filed on Mar. 20, 2012.

(51) Int. Cl.
*G01J 1/20* (2006.01)

(52) U.S. Cl.
USPC .......................................................... 250/201.9

(58) Field of Classification Search
USPC ............................... 250/201.9; 356/450, 488
See application file for complete search history.

(56) References Cited

U.S. PATENT DOCUMENTS 8,379,214 B2 * 2/2013 Farah ........................... 356/450

* cited by examiner

*Primary Examiner* — Thanh Luu

(57) ABSTRACT

The invention relates to imaging devices and methods, pertinent to electromagnetic energy in visual and other spectra, to capture and reproduce substantially all image information in a relevant spectrum through all-electronic sensors and electronic computation means.

4 Claims, 16 Drawing Sheets

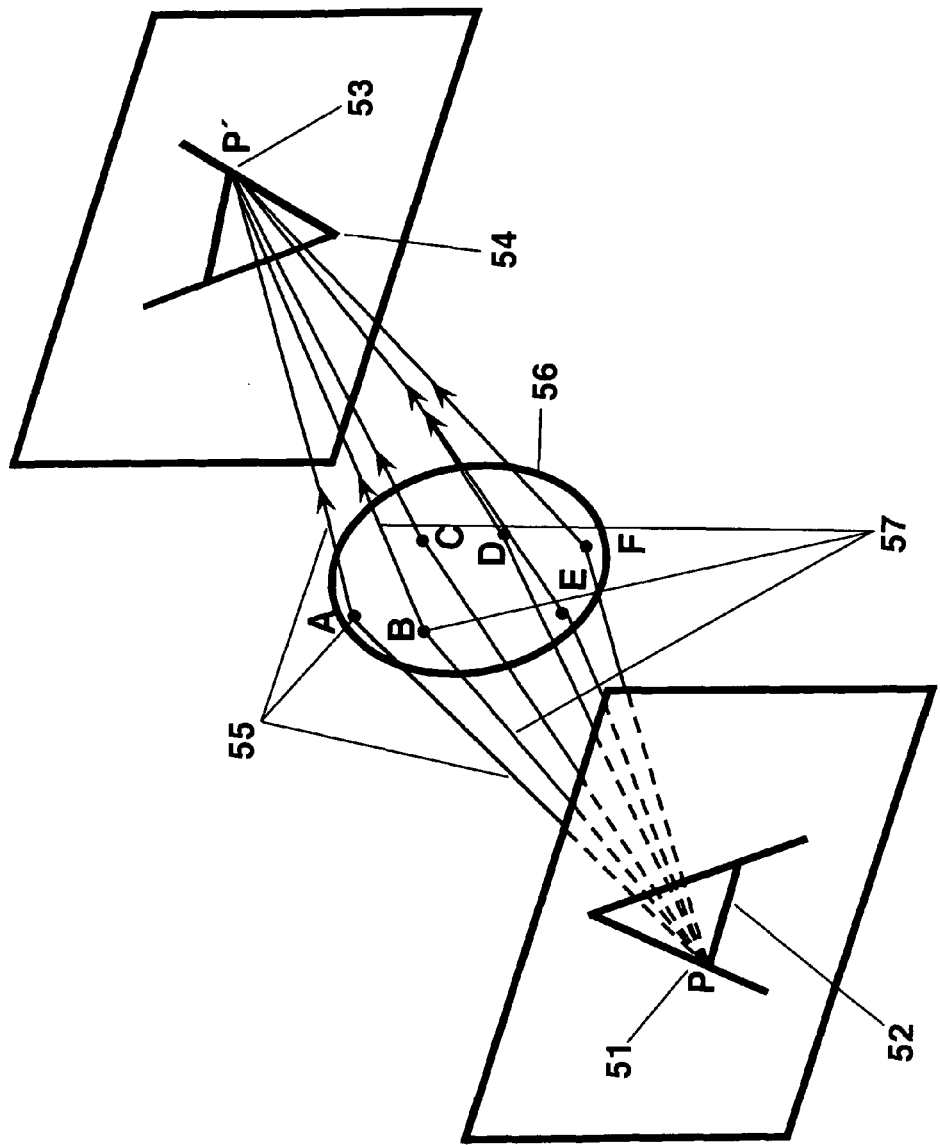
Fig. 1— Prior Art, Huygens' Principle

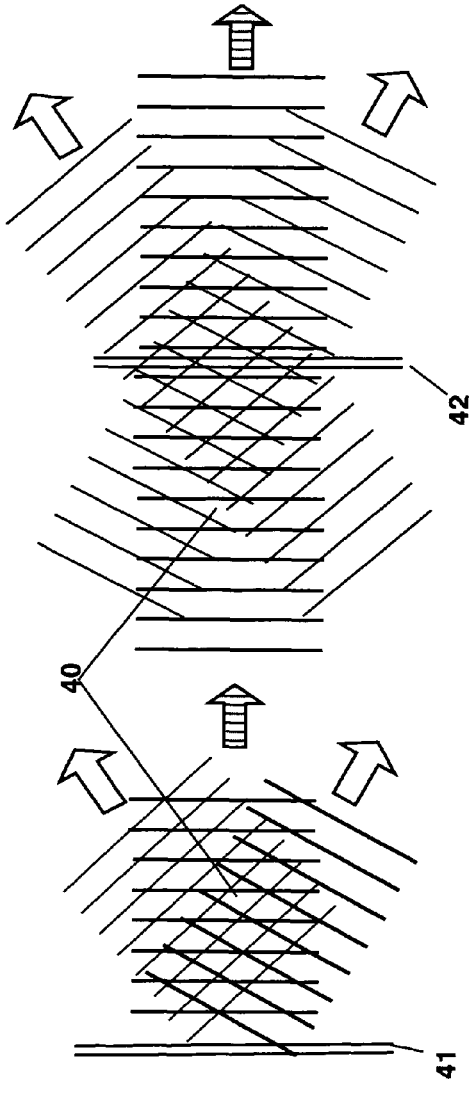
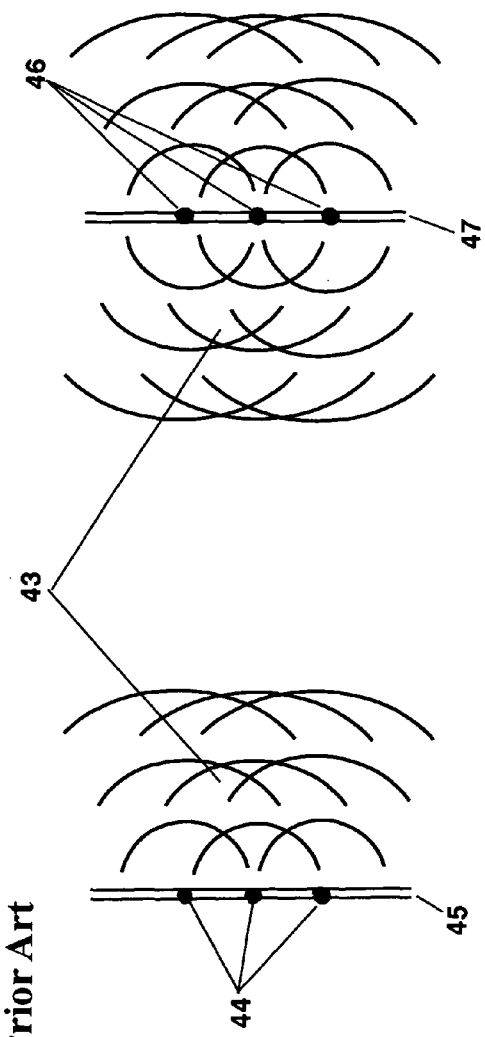
Fig. 2A — Prior Art
Fig. 2B — Prior Art 2D schematic

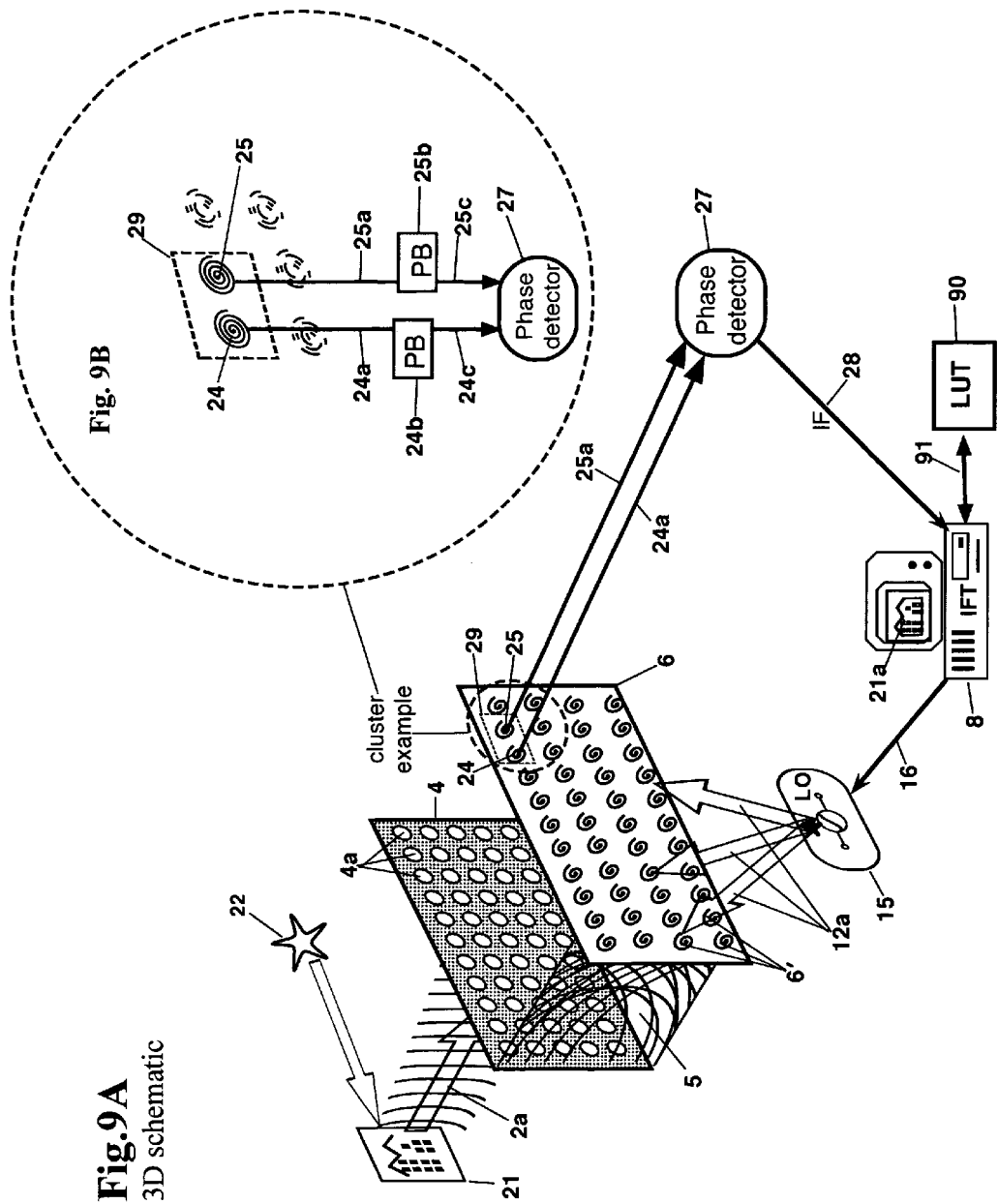

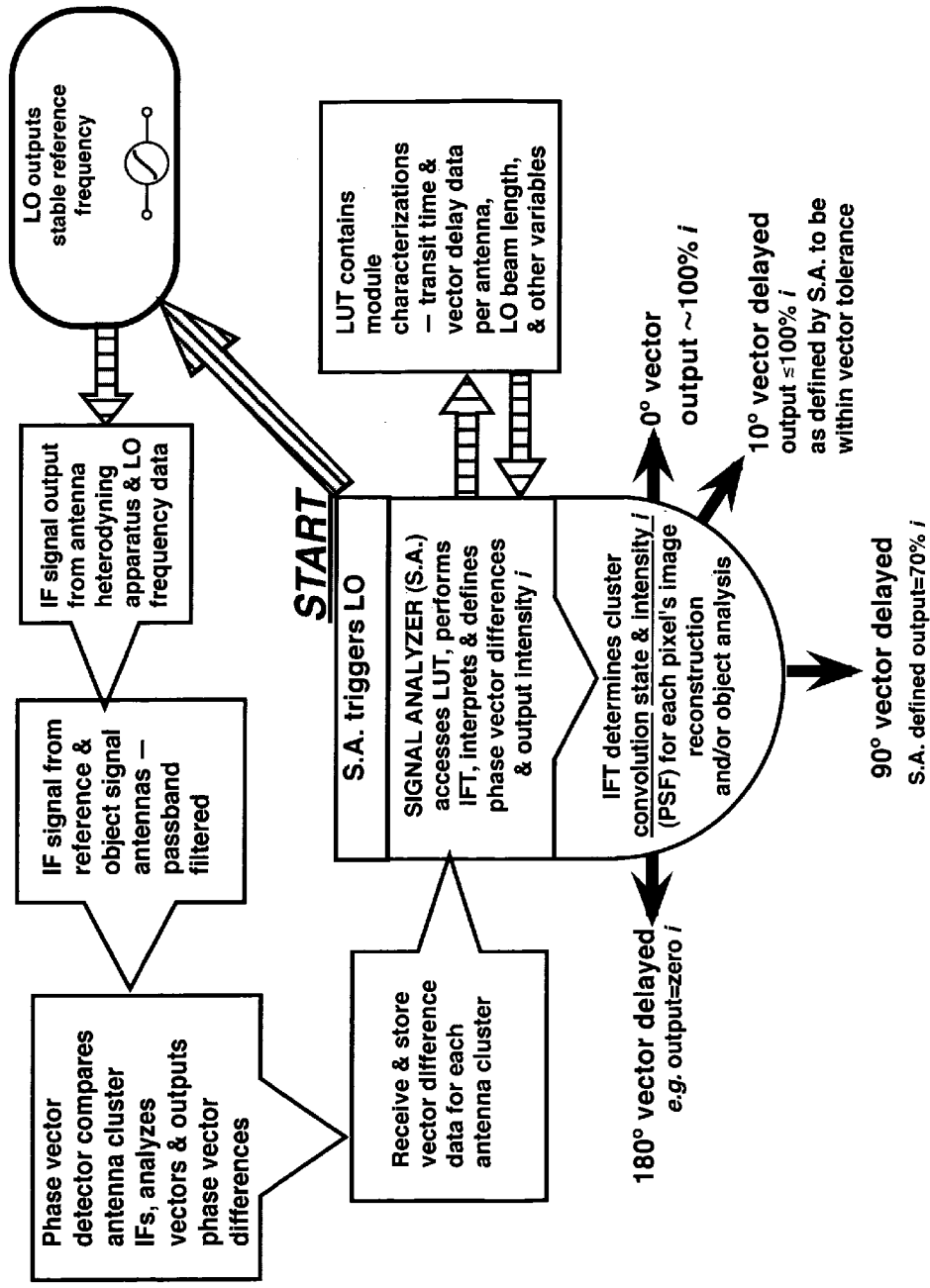
Fig. 9C — logic flowchart 3D schematic

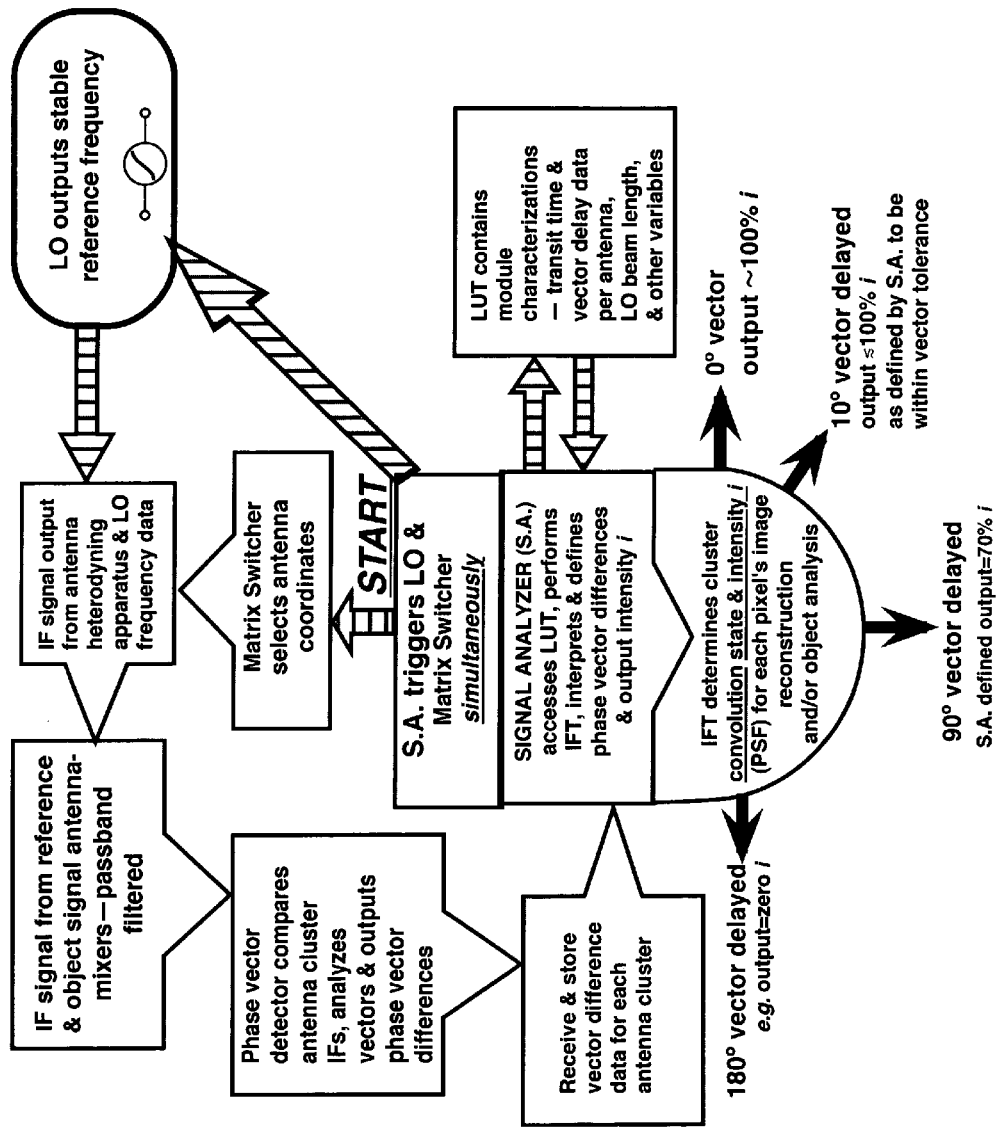
Fig. 10C — logic flowchart for addressable antennas

SOFTWARE DEFINED LENSING

TECHNICAL FIELD

The present invention relates to capturing and processing imagery, and more particularly to reproduce an image all-electronically through electronic computation means.

BACKGROUND ART

It is known in the prior art that Electromagnetic (EM) radiation can be characterized mathematically as waves as well as photons. At long wavelengths, e.g. radio frequencies, the photons have little energy and the wave properties predominate. At shorter wavelengths, e.g. the visible light bands, photons have considerable energy and are used in designing conventional light detecting systems. However, because designing conventional electronic imaging depends on photon detectors, such as CCD and CMOS devices, the apparatus cannot directly detect the phase of EM waves in the light bands. Not being able to detect and process phase means EM information is lost. An explanation of the difficulties of capturing EM phase with prior art intensity detectors is in *An Introduction to Imaging*, Milton Keynes: The Open University, 1992, Units 1 & 2, pp. 78ff, ISBN: 0-7492-5051-8.

The mathematics, describing how EM waves create images using conventional lenses follows Huygens' and Fermat's Principles, as expanded by Fourier, is found in: Parrent, GB, "The New Physical Optics Notebook," The Society of Photo-Optical Instrumentation Engineers, 1989, chaps. 1-4, ISBN: 0-8194-0130-7; Lipson, S G, et. al., "Optical Physics," 3d Ed., Cambridge, 1995, sects. 2.7 and 4.4ff; ISBN: 0-521-43631-1; and, Ditchburn, R W, Light, Dover, 1991, sect. 3.8, ISBN: 0-486-66667-0.

The technical background of the present invention will be more readily understood by reference to the following detailed description, taken with reference to the accompanying drawings, in which FIGS. 1, 2A and 2B (prior art) illustrate Huygens' Principle which describes how refraction and diffraction phenomena are used to reconstruct an image from an irradiated scene in terms of wave fronts convolving on an image plane; FIG. 3 illustrates how a light field diffracted via an aperture mask creates a phase map with its interference maxima planes; and, FIGS. 4, 5, and 6 illustrate, as applied in various embodiments of the present invention, how wave fronts diffracted via an aperture mask interfere creating a point spread function (PSF), an Airy disk, or a Fraunhofer function on a target plane (viz: Ditchburn, Chap. VI and FIG. 6.5; and Taylor, C A, Images, London: Wykeham, 1978, sects. 2.4 and 3, FIG. 3.8, ISBN: 0-85109-620-4.)

A lens organizes light waves to assemble an image on the image plane using refractive principles; these principles depend directly on superposition of the waves at the image plane. For example, one can project an image of a window in a room onto a wall opposite the window by placing the lens at its focal point from the wall. This demonstration can be duplicated by moving the lens to any location in the room and correspondingly moving the image plane to its new focal length because the wave fronts of all light waves emanating from the window scene exist in every part of the room, not just on the wall. Refraction therefore is actually the re-arrangement of light waves by a lens to produce an image on the image plane.

This is illustrated in FIG. 1 (prior art) which indicates how the lens delays each light ray, acting as a "phase-adjuster" according to the lens' geometry, so that time taken for each wave front (or wavelet) to arrive from a point on the object at the image plane is identical, creating a one-to-one correspondence map of constructive "interference maximums" points on the image plane representing the object or scene (FIG. 1 herein is overlaid from FIG. 3.10 in Taylor, op. cit., pp. 67-69).

At the points on the image plane where the EM rays' phases coincide the intensity (defined in the art as the square of the amplitude time-averaged over the wave length) is at a maximum, while "everywhere else the phase relationships are so random that the waves effectively cancel each other out and we have interference minima" (Taylor, op. cit. p. 68). This is shown by following the ray tracings in FIG. 1, which illustrates Huygens' Principle. From point P, 51, on the object scene 52 (letter "A") to point P', 53, on inverted image (of letter "A") at image plane 54, we see that the route PAP', ray 55, traverses the edge of lens 56, which is thinner than its center; similarly, PBP', ray 57, traverses a thicker part of the lens, which slows down the light proportionally, etc. At lens 56 the wave front data exist as an optical planar phase map; the lens's geometric curvatures refracts the rays, or in other words, acts on this phase data ensuring that the time taken for the electromagnetic waves traveling by any route is the same for any given route and pair of points, rays PAP', PBP', PCP', etc. The superposition of waves where their phase coincide—i.e., the simultaneous arrival of wave fronts delineating a point from the image onto the image plane—is the convolution of the interference maxima reconstructing the image of the scene on the image plane (Lipson, op. cit., sect. 4.6, "Convolution," esp. FIG. 4.11 on p. 92).

Where a glass lens inherently does phase adjustment for convolution, embodiments in this present "Software Defined Lensing" (SDL) invention use computational apparatus and software methodology for phase detection for convolution, working directly on the phase map without a lens. As is known in the art, the Inverse Fourier Transform (i.e., the inverse of a discrete Fourier transform—IFT) expresses a frequency domain function in the time domain, with each value expressed as a complex amplitude that can be interpreted as a magnitude and a phase vector component, as defined for this invention. IFT describes mathematically how a lens convolves interference maxima to reconstruct phase maps into an image, as represented by the phase map's embedded complex amplitude data. In essence, a glass lens refracting light to produce an image is a mechanical analog apparatus "computing" the interference maxima via its curvatures and material properties necessary to form the image through convolution at the lens' focal point. However, in contrast to conventional imaging, using a lens and its sensor where image phase vector convolution functions are fixed (expressed as a point spread or Fraunhofer function), in the present invention embodiments for convolution may apply programmed phase convolution tolerances, discussed further below in the embodiments illustrated in FIGS. 9C, 10C, 13A and 13B.

Multiple wave fronts reflected or transmitted from an object (or scene), at each frequency or wavelength of interest, combine to form planar wave fronts (i.e., wavelets). As known in the art, there are two mathematical models that can be used for analysis: 1) the waves can be described by the Huygens approach (as in FIG. 1) as point sources spreading in circular waves; or, 2) more appropriate for embodiments in this invention, the waves are best described as Fourier plane waves, which facilitate signal analysis of the phase map. This is explained in the following extract from a text on how the light field from an object is optically transferred and reconstructed at the image plane:

"To get an ideal image in the plane wave model (the Fourier approach), the fields in both the object and image planes must be made up from the same set of component plane waves. Each component plane wave must occur with exactly the same amplitude and relative phase in both object and image fields. Alternatively, if the light field just beyond the object transparency is regarded as being made up of many point sources (the Huygens approach), then the light from each point source must be reproduced at the corresponding point in the image plane. It must be reproduced as a point and not spread over a larger area, and it must have the correct amplitude and phase relative to all the other points. [emphasis added] . . . .

"In both models, the light field in the image plane is identical to the light field in the object plane. The field beyond the image is identical to the field beyond the object and therefore the two cannot be distinguished." (Underlined emphasis in original: *The Transfer of Optical Information*, Milton Keynes: The Open University, 1995, Units 8 & 9, p. 5, sect. 1.2, ISBN: 0-7492-5160-3.)

FIGS. 2A & 2B (prior art) illustrate the two methods in these models: "[FIG. 2A] The Fourier model (plane wave model) showing plane waves 40 diverging from the object plane 41 and converging at the image plane 42; [FIG. 2B] The Huygens model (point source model) showing spherical waves 43 diverging from points 44 in the object plane 45 and converging at points 46 in the image plane 47" (ibid., p. 5, quoted from caption for FIG. 1 overlaid herein on FIGS. 2A & 2B, bracketed figure and item numbering added). Waves 40 and 43 represent the light fields, illustrated subsequently in FIG. 3.

As known in the art, these wave fronts from the object or scene are represented as a phase map, as illustrated in FIG. 1 at lens 56, which are intercepted between the object plane and the image plane (or virtual image plane); this phase map contains the light field phase vector interference maxima signals conventionally reconstructed by a lens as an image at the image plane.

In the known art of holography, the phase map is captured on film and its reconstructed image is viewed by transmitting a coherent light of the same phase distribution as the reference beam used to make the hologram. The present invention is an electronic and software analogue to a hologram's phase modulation mechanism, i.e. its phase map (Yaroslaysky, L, *Digital Holography and Digital Image Processing*, Kluwer, 2004, ch. 2.3.2 "Imaging in Fourier Domain: holography and diffraction integrals," esp. FIGS. 2.9 & 2.10, ISBN: 1-4020-7634-7). In other light field cameras, such as the Lytro, the photon sensors only detect intensity, not phase, using micro lenses for "convolution" following conventional optical methods (U.S. Pat. Nos. 7,723,662 and 7,936,392; further explanations of light field prior art: Levoy, M, "Light fields and computational imaging," Computer, 2006, v.39, p. 46; Gershun, A, "The Light Field," Moscow, 1936, trans. by Moon, P & Timoshenko, G, *J. Math. and Physics*, 1939, v. 18, pp. 51-151).

SUMMARY OF THE EMBODIMENTS

Our prior U.S. Pat. Nos. 7,521,680; 7,437,000; and 6,985,294 are hereby incorporated herein by reference.

In one embodiment, this invention provides a lensless imaging system. This embodiment includes:

an aperture array having a first side exposed to a scene to be imaged, and having a second side from which is provided an output representative of original frequency components of electromagnetic energy from the scene and local phase differences of electromagnetic energy from the scene;

a planar array, of individually addressable antenna elements, that is disposed to receive the output from the aperture array;

a local oscillator providing a reference frequency output incident on the planar array so as to create a heterodyne difference signal between the reference frequency and each original frequency component present at each of the antenna elements;

a first passband filter coupled to a first selected set of adjacent antenna elements, corresponding to a phase reference, of a cluster in the planar array to provide a first intermediate frequency output for the first selected set of adjacent antenna elements;

wherein (i) the reference frequency has been selected to cause the intermediate frequency output to correspond to a selected frequency sub-band of the original frequency components, and (ii) the cluster corresponds to a pixel in an image of the scene;

a second passband filter coupled to a second selected set of adjacent antenna elements of the cluster in the planar array to provide a second intermediate frequency output for the second selected set of adjacent antenna elements;

a phase detector having first and second inputs coupled to the first and second intermediate frequency outputs respectively and having an output representative of the difference in phase of each original frequency component, within the selected frequency sub-band, present in the first set of elements and present in the second set of elements in the cluster; and a signal analyzer coupled to the phase detector output to determine an amplitude value associated with the cluster and therefore of the corresponding pixel in the image of the scene.

The mathematical models described in the technical field and background art section above, illustrated in FIGS. 1, 2A, and 2B, underlie conventional electronic and film imaging processes; whereby, in the next step, as illustrated in FIG. 1, the light field signal represented by waves following paths PAP', PBP', PCP', etc., are "analyzed" by lens 56 so that convolution and photon-detecting imaging takes place at an image plane as illustrated for the construction of convolution points in FIGS. 3, 4, 5 and 6. In contrast, the present invention extends U.S. Pat. No. 7,521,680 by teaching a method and apparatus for detecting directly the phase vectors of an object's wave fronts impinging an array of '680 patent light-wave-detecting antennas for subsequent processing by a signal analyzer to create an image.

FIG. 3 is a schematic overview of functionality of the present invention, essentially replacing the functions of a lens with aperture mask 54, creating phase map 55 via diffraction as a step towards creating an image through wave form convolution on a target. In this invention, a '680 antenna array positioned at one of the phase map interference planes, 56', in FIG. 3 captures the phase map data embedded in the interference maxima of the light field so that a fast IFT processor working as a signal analyzer reconstructs an image via computational means—i.e., "Software Defined Lensing." This is similar to phased array and synthetic aperture radars, which operate at lower frequencies than that of a light field. (Cheston, T C et. al., "Phased Array Radar Antennas," ch. 7, and Cutrona, L, "Synthetic Aperture Radar," ch. 21, in Skolnik, M, Radar Handbook, 2d Ed., McGraw-hill, 1990, ISBN: 0-07-057913-X.) Furthermore, in contrast to radar working at radio frequencies (RF), the present invention teaches an apparatus and methodology of replicating optical functions of a lens using computational means.

To facilitate IFT signal analyzing emulating the refractive functions of a lens, embodiments in this invention uses the Fourier planar wave model in FIG. 2A. The number of floating point arithmetic operations required for inverse discrete Fourier transform analysis at the wavelengths impinging on the antenna array can be very large. Emerging processing capabilities, such as many-core graphics processor units (GPUs), are appropriate signal analyzer tools for such large-scale bulk calculations. A bank of NVIDIA Model Tesla C2075 workstation graphics processing units is an example of a set of fast processors capable of parallel processing IFT signal analyzer algorithms for convolution (NVIDIA, 2701 San Tomas Expressway, Santa Clara, Calif. 95050). Since the IFT algorithms are applied in real time, any type of optical lens or chromatic optical filter may be emulated. The present invention can therefore extend performance characteristics and functions beyond the capabilities of conventional optical lenses and chromatic filters. Examples include: zoom, flat field, and aspherical, lenses; phase detection corrections for thermal aberrations; and extremely narrow-band chromatic or EM frequency segmentations.

Fourier transforms are described in: Webb, R H, *Elementary Wave Optics*, Dover, 2005, Appendix H, ISBN: 0-486-43935-6; Bracewell, R, *The Fourier Transform & Its Applications*, 3d ed., McGraw-Hill, 1999, ch. 3, ISBN: 978007303938. Software for convolution and reconstructing images applying Fourier transforms, IFT, and optical phase maps are found in *MathWorld*, Wolfram Research, Inc., 100 Trade Center Drive, Champaign, Ill. 61820-7237; MatLab™, MathWorks, 3 Apple Hill Drive, Natick, Mass. 01760-2098; and Isen, F W, *DSP for MATLAB™ and LabVIEW™, Volume II: Discrete Frequency Transforms*, Morgan & Claypool, 2008, ISBN: 9781598298932, esp. chap. 1.5 "Inverse DTFT," pp. 13-14, and chap. 3.19 ff on "Inverse Discrete Fourier Transforms". Phase retrieval algorithms are described in: U.S. Pat. No. 6,545,790 B2; Dierolf, M, "Development of a Lensless Microscopy Technique for Imaging Cellular Structures," Diploma Thesis in Physics at Ulm University, Oct. 22, 2007; Giewekemeyer, et. al, "Quantitative biological imaging by ptychographic x-ray diffraction microscopy," doi: 10.1073/pnas.0905846107; and Elser, V, "Phase retrieval by iterated projections," *J. Opt. Soc. Am. A*, v.20, p. 40. In contrast to the present invention, which detects phase directly via EM antenna apparatus and associated methodologies, the phase retrieval apparatus in the cited references apply optical phase filtration apparatus and methodology.

The '680 patent teaches how an antenna configured for light wave frequencies detects and tunes light waves impinging a light wave antenna. This is done in the '680 patent via an heterodyne and frequency mixing apparatus, applying a highly stable, frequency-agile, reference signal known in the art as a local oscillator (LO), and downshifting the detected energy so that conventional RF apparatus can decode the data (analogous to the methodology of an heterodyne radio receiver). The LO in the present invention is based on the apparatus described in the '000 and '294 patents and the reference signal for heterodyning in the '680 patent (column 4, line 55ff); the heterodyning function thereby outputs a down-converted intermediate frequency (IF) required by the signal analyzer in this invention for phase analysis.

A sweep generator in the '680 patent apparatus (column 6, line 6j) is connected to the reference LO; sweep is accomplished in stepwise or stepped fashion across the full or a select spectrum of the light band, including IR, UV and X-rays. The IF (with spurious responses eliminated by passband filters) may be lowered to frequencies that are customarily used for phase locked loop detection by remixing with additional local oscillators, as is known in the art, for multiple heterodyne conversion.

The present invention teaches how the heterodyned, highly stable reference signal in the '680 patent is configured for multiple methods in differing imaging embodiments for building a phase map from the impinging light fields for IFT signal analysis, to wit: 1) in a set of embodiments (e.g., FIG. 11), the LO signal is applied to irradiate the object so that the LO phase and the irradiation phase are coherent and coincident, constructing the phase map iteratively at each frequency of interest; and, 2) in another set of embodiments (e.g., FIG. 12), the LO signal is used as a stable reference to detect comparative phase vectors among one or more adjacent antennas in a cluster impinged by ambient light reflected from the object at one temporal period. The '680's sweep generator is similarly utilized in the present invention, selecting a single frequency from the LO sweep steps, for detecting the light field's monochromatic phase map and interference maxima for each time slice and each frequency of interest.

The invention teaches creating data-rich, aberration-free, color images and filtration superior to optical systems with photonic sensors and elements, viz:

1) Instead of frequency (color) segmentation by, relatively broad passband optical filters in conventional camera apparatus, in this invention, narrow frequency separation for the spectrum (or frequencies) of interest is software controlled applying the '680 sweep generator apparatus. To form a full or selected spectrum color image for the selected spectrum of the captured object, each of the monochromatic images captured, as described above, are combined using combinatorial methodology for color separations as known in the art. ImageJ is an example of color processing and stacking software. Available as open-source from the U.S. National Institute of Mental Health, National Institutes of Health, 9000 Rockville Pike, Bethesda, Md. 20892.

2) Chromatic aberration due to "variation of parameters" of optical components (i.e., frequency dispersion as found in glass lenses, Buchdahl, H A, *Optical Aberration Coefficients*, chap. XIV, Dover, 1968, ISBN: 978-0486620107) is virtually eliminated since all frequencies are detected separately by the software-controlled '680 apparatus and reconstructed separately by the present invention's methodology.

3) The present invention is distinguished from adaptive optics' aberration-compensating methodology, with its associated complex phase filtering apparatus, in that wave detection herein is via '680 patent wave-based antennas and wave front manipulation is entirely computationally-based rather than with deformable mirror apparatus (Tyson, R, Principles of Adaptive Optics, 3d Ed., 2010, Taylor & Francis, ISBN: 978-143-980-858-0). Moreover, compensation for refractive parameter variations preceding the sensor apparatus (e.g., height and atmospheric temperature coefficients, viz. Buchdahl, op. cit., p. 195) can apply adaptive optics' prior art via the present invention's signal analyzer methodology alone without introducing deformable mirror apparatus. In addition, this invention's signal analyzer can be used to ameliorate conventional lens and camera thermal-dependent dimensional effects and vibrations.

4) Synthetic aperture, enhanced resolution beyond normal limits expected for optical systems is made possible via the present invention's multiple aperture array for phase map construction, multiple phase vector detector apparatus, and IFT signal analyzer. Furthermore, since no refractive lenses are used in this invention's wave-based antenna apparatus, resolving power is improved by eliminating the low-pass optical filtering and internal reflection artifacts inherent in refractive lenses, permitting conventional optical diffraction and modulation transfer function limits to be exceeded.

BRIEF DESCRIPTION OF THE DRAWINGS

The foregoing features of embodiments will be more readily understood by reference to the following detailed description, taken with reference to the accompanying drawings, in which:

FIGS. 1, 2A and 2B (discussed above in background art) illustrate how refraction and diffraction phenomena, in terms of EM waves, reconstruct an image from an object using conventional lens apparatus.

FIGS. 7 through 10C describes the apparatus in the present invention for creating the phase map, its detection by various phase vector detector apparatus and methodologies, and image creation in several embodiments of this invention;

FIG. 7 is a functional schematic simplified overview of the entire apparatus used in several embodiments;

FIG. 8 is a two-dimensional profile functional schematic illustrating in more detail how phase vectors are detected and, as an example, how the apparatus reconstructs one pixel for an image;

FIGS. 9A and 9B expand in more detail for one pixel cluster the process outlined in FIG. 8 via a three-dimensional schematic;

FIG. 9C is a logic flow diagram illustrating the steps for determining convolution for pixel image reconstruction for one frequency of interest;

FIG. 10C is a logic flow diagram, essentially the same as FIG. 9C, illustrating the steps for determining convolution for addressable antenna components;

DETAILED DESCRIPTION OF SPECIFIC EMBODIMENTS

Definitions

Figure 3:
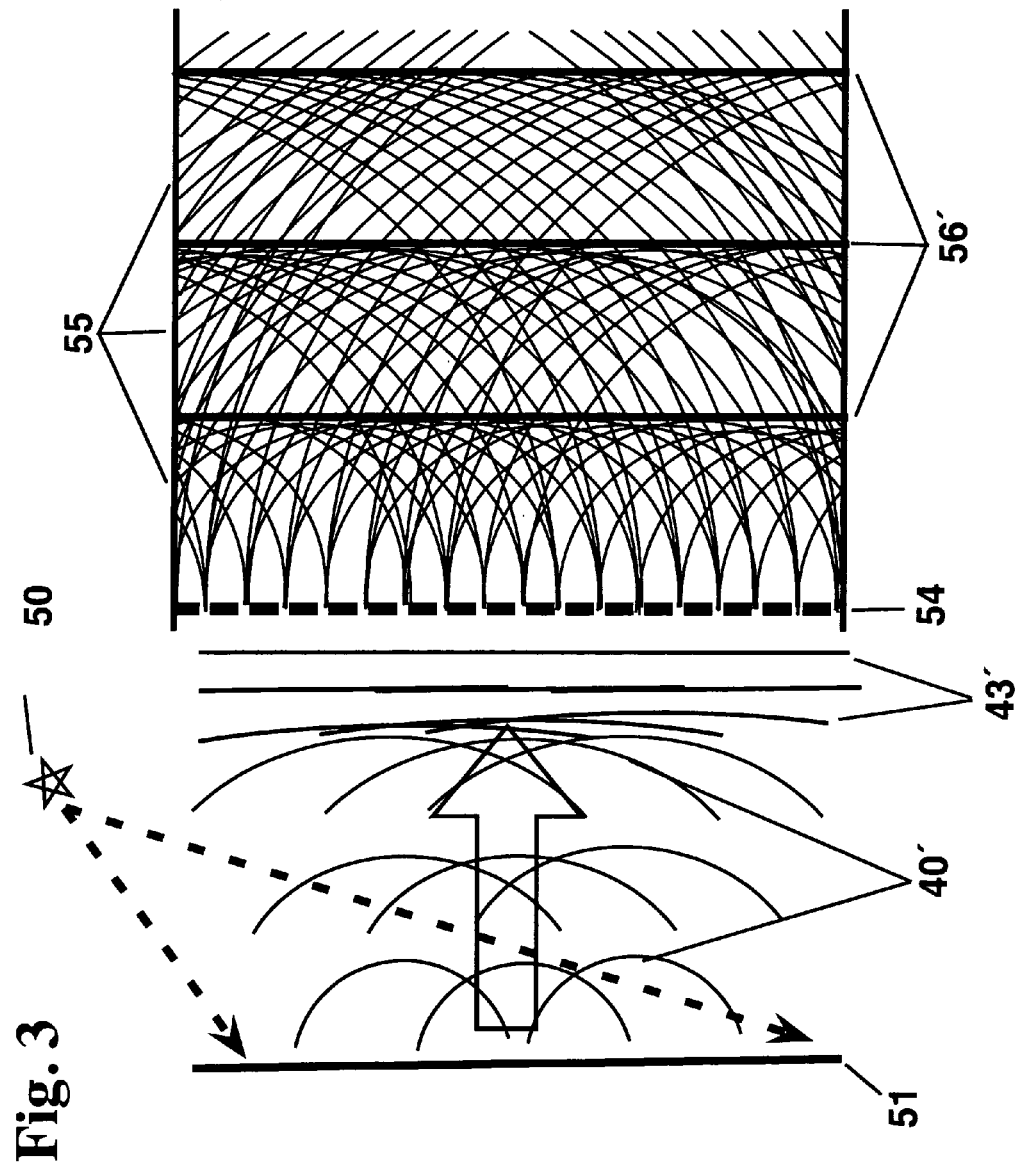
FIG. 3 illustrates in general how a light field from an object creates a phase map via an aperture mask, and how the interference maxima planes within the phase map can be used to reconstruct an image with the present invention using antenna apparatus.

As used in this description and the accompanying claims, the following terms shall have the meanings indicated, unless the context otherwise requires:

Electromagnetic (EM) radiation (as known in the art) includes radio waves, millimeter waves, infrared, visible light, ultraviolet, and x-rays.

A phase vector or vector is a phase difference of a received EM wave as compared to the phase of a reference EM signal. The vector may be expressed as a phase angle with the reference signal set at 0°.

An antenna is an EM heterodyned wave receiver for light bands (including infrared, visible light, ultraviolet and soft x-rays) as taught in U.S. Pat. No. 7,521,680.

Diffraction is the physical phenomenon of "any arrangement [of EM waves impinging an area on a target] which causes a change in amplitude or phase which is not the same over the whole areas of the wavefront" (Ditchburn, op. cit., ch. VI, p. 152, brackets added).

A light field is a complex function describing the EM energy as waves radiating from an object in all directions through space.

A phase map consists of a set of interfering EM wave fronts emanating from an object's light field via diffraction through one or more small apertures.

A pixel is the small area on the image in the form of a point spread function (PSF) or Fraunhofer function (as known in the art) corresponding to a small area on the imaged object.

Convolution or convolving is generally a mathematical process on two functions, producing a third function that is a modified version of one of the original functions, measuring overlap as one of the original functions is shifted in relation to the other. Specifically, in this context we use this term to refer to the convolution of outputs from first and second sets of antenna elements in a cluster to determine the extent of correlation between the two outputs. When the correlation is sufficiently high, the cluster is used in providing a pixel output in representing the scene.

A pixel cluster or antenna cluster is a set of adjacent antenna elements of an antenna array receiving EM radiation (here, as a phase map output from the aperture array) from a small area on the object; via the various apparatus and related methodology in this invention, the cluster's data is reconstructed as a pixel on the image.

A phase detector or phase vector detector is an electronic component, coupled to first and second sets of antenna elements in a cluster, that provides an output representative of a difference, in phase of each original frequency component, present in the first set of elements, corresponding to a phase reference, and present in the second set of elements.

A signal analyzer is a computational apparatus capable of executing Fourier transform and inverse Fourier transform algorithms (as known in the art) for image convolution and for incorporating phase vector difference data for computing for each EM antenna on an array its phase, including compensation for associated array delay factors.

The embodiments of the invention described above are intended to be merely exemplary; numerous variations and modifications will be apparent to those skilled in the art. All such variations and modifications are intended to be within the scope of the present invention as defined in any appended claims.

FIG. 3 illustrates how light fields 40' and 43' impinging mask 54, consisting of multiple apertures, create phase maps via diffraction at various planes 56' representing interference maxima. Light from source 50 reflects off distant object plane 51 transmitting the light field initially shown as Huygens' wave fronts 40', thence gradually flattening to plane waves 43' and impinging on mask 54 which consists of multiple small apertures. Waves 55 interfere, according to diffraction phenomenon, at several planes 56' which represent phase maps containing interference maxima signals that can be analyzed via inverse Fourier transform algorithms to reconstruct an image of object 51. The mathematics of diffraction are found in Born, M. et al, Principles of Optics, 6th Ed., Pergamon, 1980, ch. VIII. ISBN: 9780080264820; prior art implementations using multiple apertures are explained in Ditchburn, sect. 6.21, "Babinet's Theorem," and sect. 6.22 "Diffraction by a Number of Circular Apertures or Obstacles"; and practical implementations of circular apertures for Fresnel diffraction are illustrated in Walther, A, "Diffraction," chapter in Kingslake, R, *Applied Optics and Optical Engineering*, Academic Press, 1965, pp. 246-254ff, ISBN: 0-12-408601-2.

Figure 4:
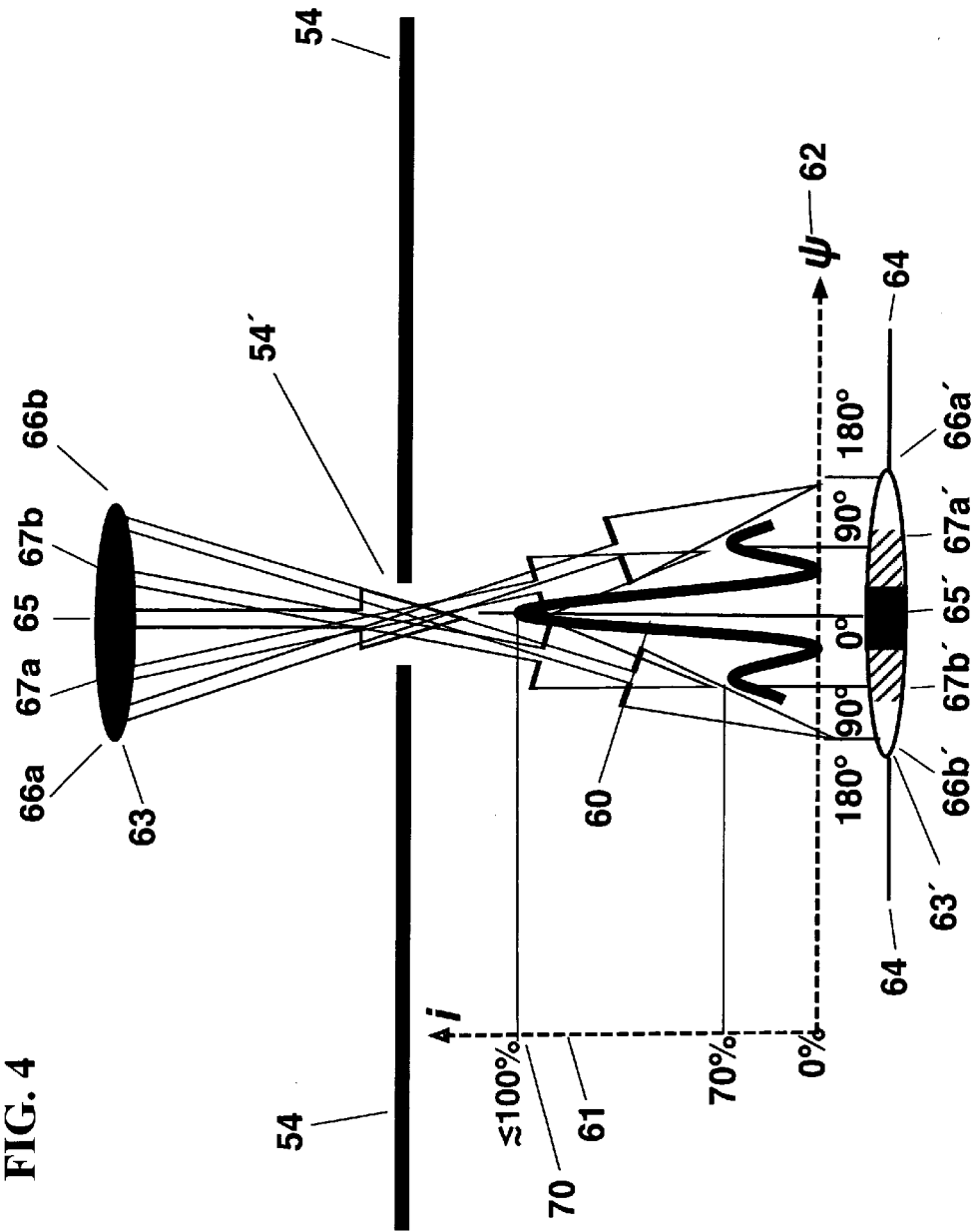
FIGS. 4 through 6 illustrate in cross-section how a point spread function (PSF), Airy disk, or Fraunhofer function image of an object is created by wave fronts diffracted through a small aperture, or a series of small apertures in an aperture mask, and terminated at an image plane. The waves in these figures are of a single frequency to better illustrate the background art for the present invention in which embodiments capture light in sequential, monochromatic steps.

FIG. 4 is basically one point object 63 (for example, as imaged in a pinhole camera) showing, in an exaggerated ray tracing schematic, the construction of point image 63' on image plane 64 as an Airy Disk due to diffraction through aperture 54' (one of many apertures from FIG. 3, mask 54). Superimposed on this cross-section schematic is the image's monochromatic Airy Disk (PSF) graph, with relative intensity I on ordinate 61 vs. EM phase vector $\psi$ along abscissa 62 ($\psi=0°$ at the center of 62). The vector of ray 65-65' from object 63 equals $0°$ at time $t=0$ (according to this invention's definition of vector, this is the reference phase) as it impinges image plane 64, therefore at that point it is approaching maximum intensity 70 ($\leq 100\%$) on the graph's ordinate, imaged black at 65' on image plane 64. Rays 67a-67a" and 67b-67b' scatter off center, e.g. a vector delayed by $\psi=90°$ at $t=0$, and therefore, in this example, its wave fronts image on plane 64 at 70% intensity, imaged cross-hatched at 67a" and 67b'. Rays 66a-66a" and 66b-66b' are vector delayed by $\psi=180°$, and therefore register zero intensity on plane 64, imaged white at 66a" and 66b'. In an actual imaging device, the further the phase vector is delayed or shifted from $\psi=0°$ the fuzzier the image of an object point gets. So, point 63 gets fuzzier as its image 63' spreads on the image plane, an indication of its sharpness; hence, all points in a real imaging device are never precisely the same as the object, due to diffraction and scattering, but are always somewhat degraded as represented by the PSF.

Figure 5:
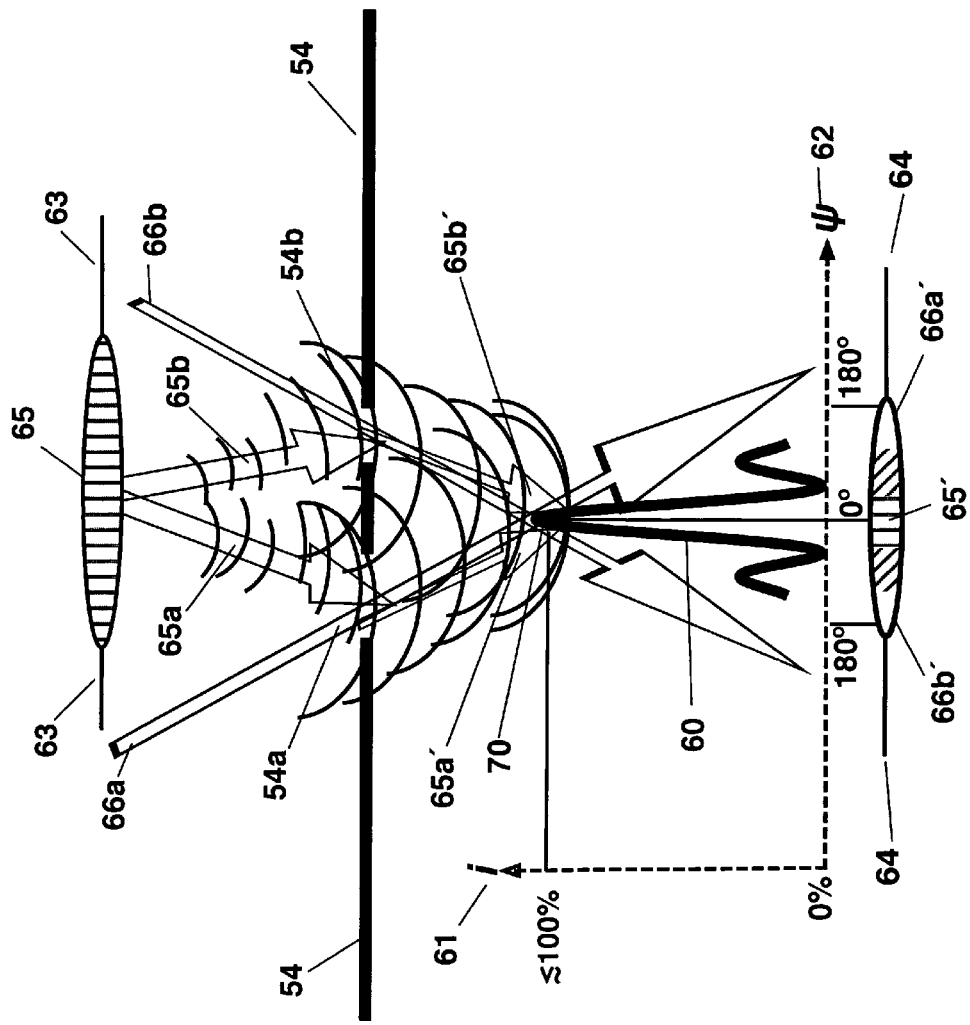
Figure 6:
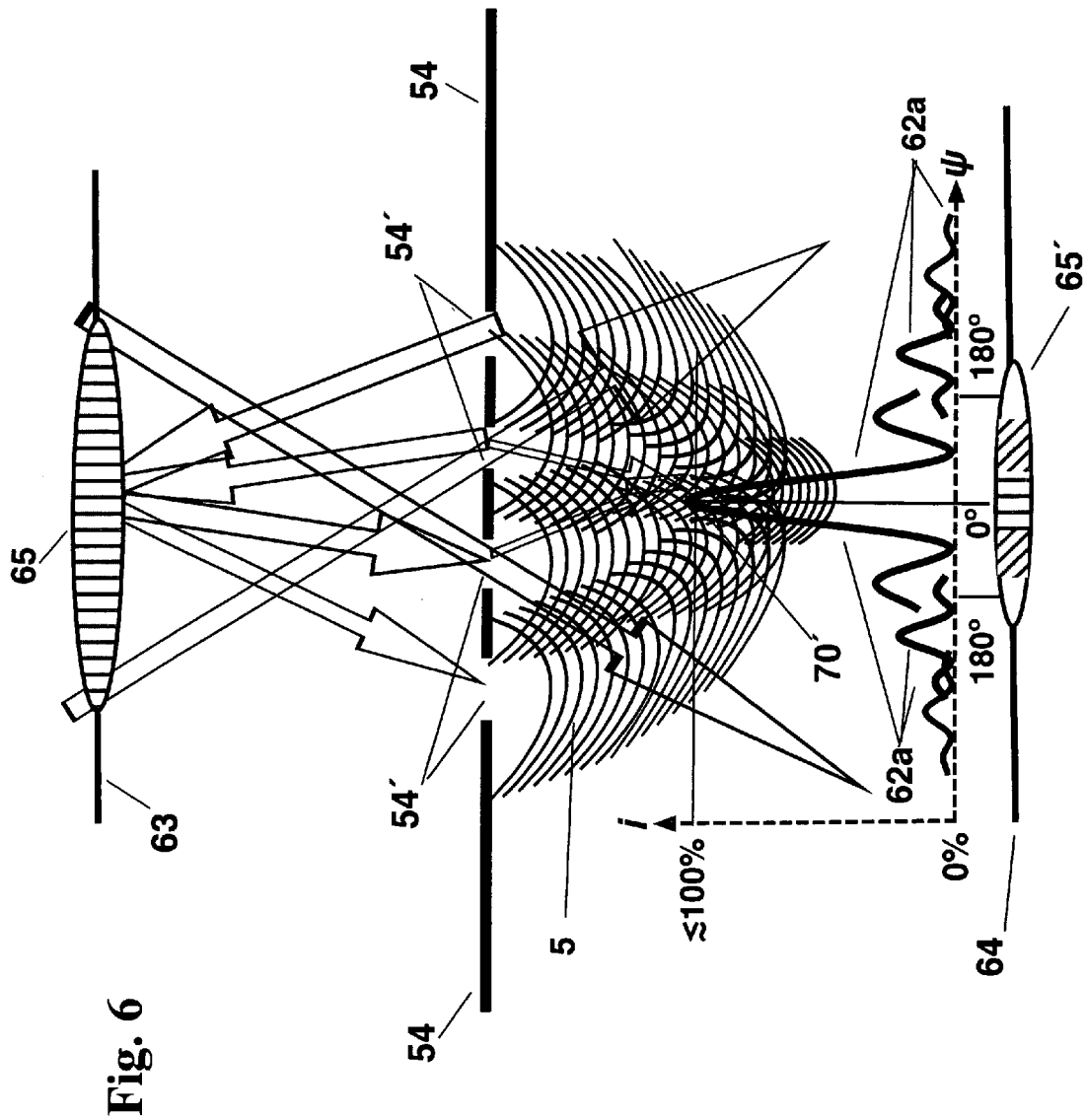

FIG. 5 illustrates the construction of a convolved "PSF" via two closely spaced apertures in contrast to the simplistic, pinhole camera phenomenon example illustrated in FIG. 4. The image at plane 64 in FIG. 5 is essentially a Fraunhofer diffraction or interference pattern (viz., Ditchburn, op., cit. FIG. 6.3, and sects. 6.1 and 6.2). This is best understood by the two-slit interference experiment (viz., Feynman, R, et. al, *Lectures on Physics*, Addison-Wesley, 1965, sect. 1-3. ISBN: 0-201-02118-8). FIG. 5 shows how the radiation from object 65 on object plane 63 to image 65' generates a complex Fraunhofer pattern at image plane 64 from two sets of interfering waves represented by rays 65a-65a' and 65b-65b' diffracting through two apertures 54a and 54b in aperture mask 54. Interference maxima is at convolution point 70 on intensity-vector graph 61, 62 (intensity $I=\leq 100\%$ at vector $\psi=0°$, the reference phase point); imaged black on image plane 64 at point 65'. Vectors at points 66a" and 66b' are $180°$ delayed from the reference for convolution, so these points register zero intensity, imaged white as on the similar image plane 64 in FIG. 4.

FIG. 6 illustrates, in a simplified schematic showing four small, narrowly spaced apertures 54' in aperture mask 54, how diffraction phenomena begin to build phase map 5, consisting of n irradiating wave fronts emanating from object 65 on object plane 63. Convolution point 70', $\psi=0°$, is at intensity maxima; 65 is therefore imaged at 65' at image plane 64, its "PSF" illustrated as a spreading Fraunhofer pattern 62a similar to that illustrated in FIG. 5. The image created by waves emanating from various directions towards the edges or beyond object 65 is progressively degraded towards zero intensity in both abscissa directions from the center ($\psi=0°$) of 65', as described for FIGS. 4 and 5. Optical control of PSF-related diffraction phenomena in conventional cameras is normally done by changing the aperture size affecting depth of field and the modulation transfer function (MTF) for resolution; in several embodiments in the present invention a computational apparatus and methodology is described for variable PSF affecting image resolution.

Figure 7:
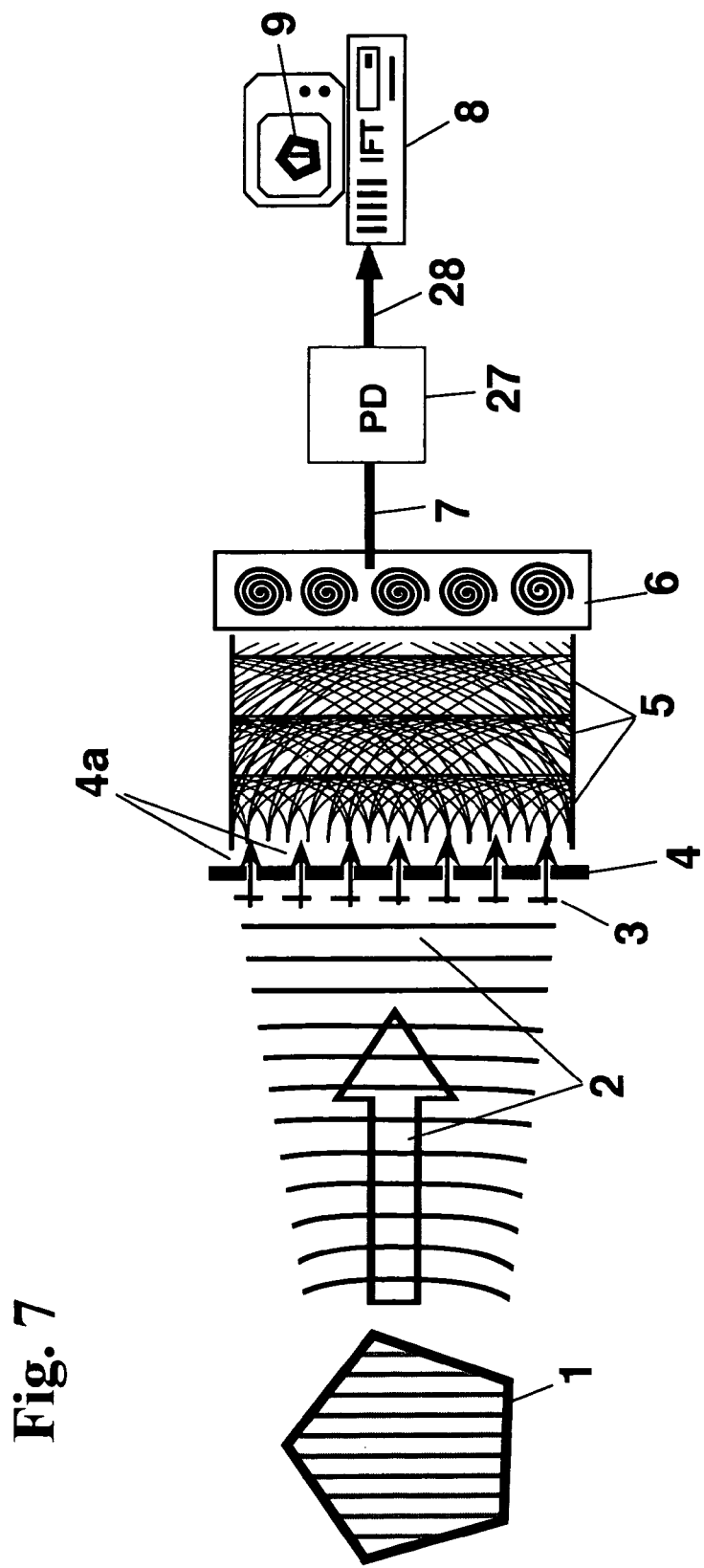

FIG. 7 is a schematic overview of the entire apparatus used in several embodiments of the present invention to create an image without using a lens. Object 1 reflects (or transmits) light field 2 creating planar wave fronts 3 at the entry of mask 4 consisting of an array small apertures 4a. The planar wave fronts 3 pass through apertures 4 creating phase map 5 (as illustrated with items 54, 55 and 56' in FIG. 3), for select wavelengths of interest, representing object 1's set of interference maxima. Antenna array 6 includes a plurality of antenna elements. As we show in further detail in FIG. 8, a local oscillator provides a reference frequency output incident on the planar array so as to create a heterodyne difference signal (which may be considered as a phase vector) between the reference frequency and each original frequency component that is present on the antenna elements. The heterodyne difference signal is at an intermediate frequency, in accordance with the '680 patent, and is sent to phase vector detector 27 which determines the vector differences for the antenna array. Vector difference signal data is then transmitted to signal analyzer 8 which applies IFT algorithms for each selected wavelength reconstructing image 9 of object 1.

U.S. Pat. No. 6,545,790 B2 (cited above) describes a system and method for recovering phase information from recorded conventional photonic detectors and spatial light modulator phase filters. The present invention is distinguished from the '790 patent in that phase vectors and pixel intensity are detected via EM wave antennas and wave-based heterodyne apparatus and methodology. However, the Fourier transform methodologies prior art cited in systems related to the '790 patent are relevant to this invention's apparatus and methodology for signal analysis.

Figure 8:
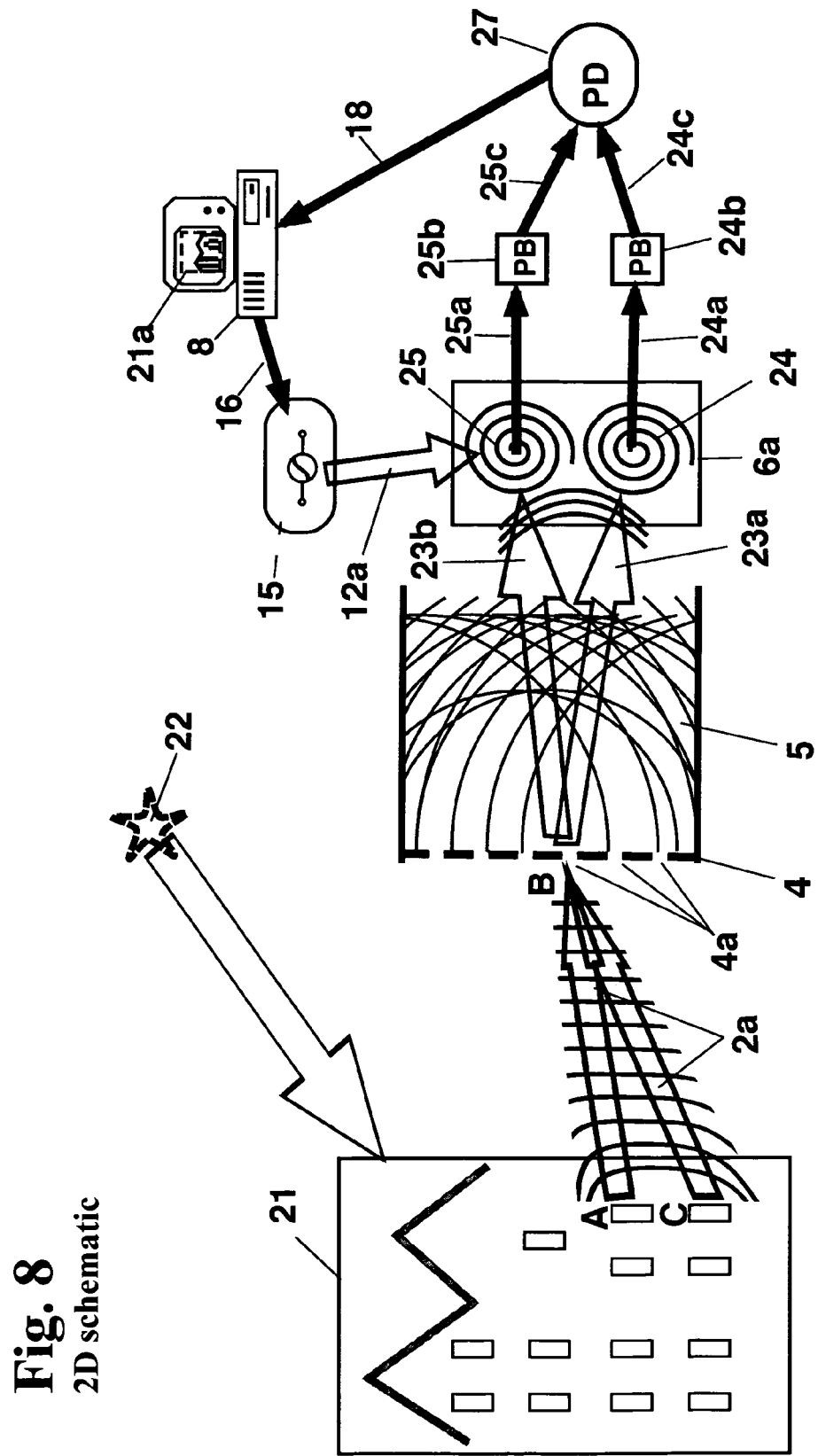

FIG. 8, a two-dimensional profile schematic relevant to several embodiments of the present invention, illustrates an example methodology in more detail of how a set of two antennas 6a (representing one pixel cluster in antenna array 6 in FIG. 7) receives phase vectors and sends these signals to various apparatus for reconstruction of one pixel in image 21a. Object 21 is illuminated by light source 22. Phase map 5 is formed by receiving light field 2a from object 21 via aperture mask 4 consisting of an array of n apertures 4a. Antenna cluster 6a includes two or more heterodyne antenna elements, e.g. 24-25 (for example, in one embodiment FIG. 13A below, seven) which receive phase map 5 as complex interference maxima signals 23a and 23b. Antenna elements 24-25 operate cooperatively in light frequencies for each frequency of interest, receiving the phase vector signals necessary to eventually reconstruct via IFT one pixel in image 21a, following this methodology: One antenna element in cluster 6a, e.g. 24, is assigned as the vector reference for that cluster, according to the definition for this invention. Signal analyzer and processor 8 selects a frequency of interest for LO 15 (the low-noise stable frequency oscillator described above for the '680 patent apparatus, not shown in full in this figure) to generate as signal 12a. Interference maxima signal 23a is created by ray A-B reflected via light field 2a from object 21 through two or more apertures 4a to phase map 5 (as illustrated for two apertures in FIG. 5). Reference antenna element 24 in cluster 6a heterodynes LO signal 12a with interference maxima signal 23a outputting IF signal 24a to passband 24b. Similarly, interference maxima signal 23b is created by ray C-B reflected via light field 2a from object 21 through two or more apertures 4a to phase map 5. Simultaneously with that of the reference antenna element 24 actions, adjacent antenna element 25 in cluster 6a heterodynes LO signal 12a with interference maxima signal 23b outputting IF signal 25a to passband 25b. The phase vector of ray A-B is detected at a known time at reference antenna 24 while the phase vector for ray C-B arrives at adjacent signal antenna 25 at a slightly different time (i.e. the two signals will not have the same amplitude and relative phase, as described for the models in FIGS. 1, 2A and 2B); this results in a vector difference which will be used to determine the relative phase of the pixel represented by cluster 6a for convolution analysis by signal analyzer 8. If necessary to reject spurious responses from unwanted image signals (as known in the art for superheterodyne apparatus; viz., *Electronic Engineers' Handbook*, 4th Ed., McGraw-Hill, 1996, sect. 18.8.1, ISBN: 0-07-021077-2), IF signals 24a and 25a are passed through passband filters 24b and 25b, respectively (more than one IF downshifting, and related passband filtering may be necessary as discussed in the '680 patent). Although we have specified use of passband filters, it will be understood that such filters may actually be incorporated into other structures, such as the antenna elements themselves, with the effect that the antenna elements themselves accomplish passband filtering, and such structures will be understood to include "passband filters" as referenced herein. Thence, remaining IF signals on links 24c and 25c are input into phase vector detector 27 where the IF signals are compared for their phase difference. (Texas Instruments' part no. CD4046B is an example of a phase lock loop apparatus which could be used herein for phase detection; 12500 T I Boulevard, Dallas, Tex. 75243.) Phase detector 27 outputs phase difference signal 18 for each pixel cluster 6 (in FIG. 7) to signal analyzer 8 which applies IFT algorithms for convolution analysis for one temporal period at the frequency of interest, thereby reconstructing object 21 as monochromatic image 21a. A color image may then be assembled, as described above. Signal analyzer 8 also controls frequency sequencing for LO 15 via link 16, as described in patent '680.

FIGS. 9A and 9B expand in more detail the process of the present invention outlined in FIG. 8 via a three-dimensional schematic. Following the methodology and apparatus in FIG. 8, FIG. 9A illustrates one embodiment of this invention whereby object 21 is illuminated by light source 22 which causes light field 2a to impinge on aperture array 4, consisting of n small apertures 4a arranged on a mask. The light field traversing the aperture mask creates phase map 5, which is received by antenna array 6 consisting of n antenna elements 6' arranged in pixel clusters. One cluster for one pixel, e.g. 29, is expanded in FIG. 9B for clarity. As in FIG. 8, antenna 24 and 25 create IF signals via heterodyning using LO 15, its reference frequency for mixing 12a and the apparatus and methodology of patent '680; IF output signals on links 24a and 25a are sent to phase vector detector 27 which couples vector comparison signal 28 to signal analyzer 8 for image reconstruction, as described above.

FIG. 9B (inset) shows in more detail the signal paths from the reference antenna 24 and the object signal antenna 25 in pixel cluster 29 for phase vector detection. If necessary to strip spurious images, IF signals 24a and 25a are passed through passband filters 24b and 25b respectively, as in FIG. 8, yielding IF signals on links 24c and 25c for vector comparison by phase vector detector 27.

There is not necessarily any point-to-point correspondence between the position and number of apertures and the position and number of antenna elements or clusters in the antenna array. The relationship of apertures, aperture sizes, antennas, and antenna array geometry depends in different embodiments on different resolution requirements. For example, a larger number of apertures generates more interference maxima via the phase map increasing potential resolution, but lowers the received energy measured in PSF amplitude, all other elements, including antenna array architecture, held constant (viz, Taylor, op. cit., FIG. 3.8).

While all the antenna elements in all the clusters in FIG. 9A, at one frequency of interest, receive the identical, coherent stable LO 15 signal for heterodyning, there are link delays due to total path differentials for the LO light paths 12a between the reference antenna 24 (which can be set at t=0) and n adjacent object signal antennas 25 in various embodiments, for IF links 24a and 25a, and for phase vector detector 27's electrical connections. If there were no compensation for these link path differentials, the various vector signals being coupled to signal analyzer 8 will be slightly phase delayed yielding incorrect convolution functions even though interference maxima is detected correctly by the antenna cluster as interpreted by the phase vector detector. In this embodiment, differential vector delay parameters are stored in lookup table (LUT) 90 connected to signal analyzer 8 via two-way link 91. The processor algorithms use LUT 90 to determine the correct phase signal offset for each antenna 24-25 and their respective links for correct IFT processing. Signals on links 24a-25a and on link 28 are at IF.

One embodiment for creating the LUT vector time delay parameters in FIG. 9A is to apply a partially reflective surface on the front of antenna array substrate 6 (on the side towards the object). In this methodology, LO 15 pulses a signal at t=0 which reflects from the reflective surface to the antenna array 6, with the return signals polled from each of the antenna elements 6' and their respective links (e.g. 24a and 25a), recorded sequentially from t=0 as phase vector time delays on the LUT for correction inputs to the IFT algorithms for signal analyzer 8. This LO 15 signal pulse may be pulsed between each frame capture, or at variable time intervals, if necessary to re-calibrate differential delays.

Another LUT time delay creation embodiment pulses a coherent signal to the antenna array 6' reflecting from a calibration target at a known distance in front of aperture mask 4 (FIG. 9A). A related embodiment pulses a signal onto aperture mask 4 directly.

Another embodiment scans the aperture mask 4 so that only a small segment, e.g. one cluster, of the antenna array 6' described in FIG. 9A is energized at a time, sequentially building the vector delay differentials' LUT.

FIG. 9C is a logic flowchart illustrating the methodology for image reconstruction for one frequency of interest, applying phase shift vectors for PSF creation and IFT algorithms. The PSF vector delay and vector tolerance examples are as illustrated in FIGS. 4, 5 and 6. To produce a color image as discussed above, this logic flow is repeated for each frequency of interest as triggered by the LO and the signal analyzer.

Figures 10A, 10B:
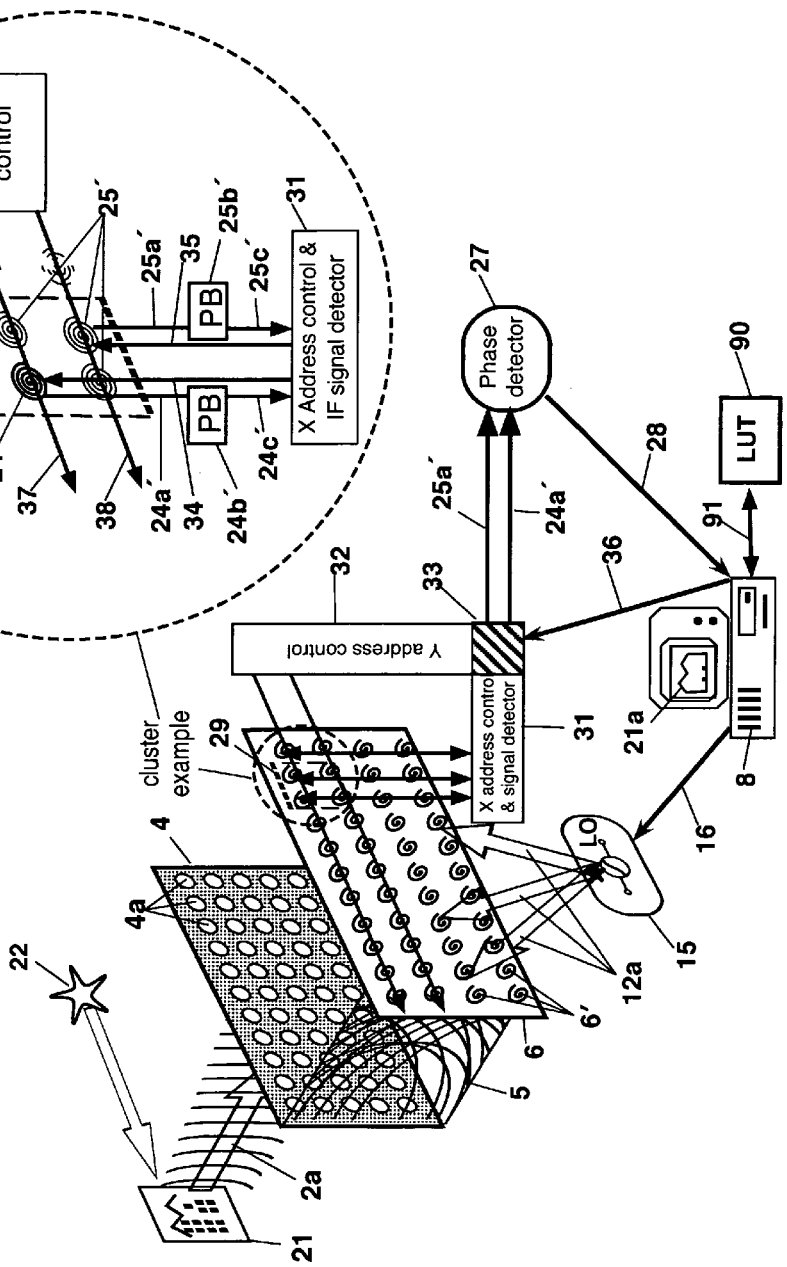
FIGS. 10A and 10B, essentially the same as FIGS. 9A and 9B, with the variation illustrating individually addressable antenna components for image reconstruction.

A related embodiment illustrated in FIGS. 10A and 10B follows the methodology, apparatus and reference numbering of FIGS. 9A and 9B. In this embodiment, in addition to the description for FIGS. 9A and 9B, each of n antenna elements 6' in antenna array 6 are individually addressable using matrix switcher 33 coupled to address controllers 31 and 32 and sending IF output signals on links 24a' and 25a' to phase vector detector 27. Controller 31 is both the X or abscissa axis address control and signal detector for antenna array 6, and controller 32 is the Y or ordinate axis address control for array 6; both controls 31 and 32 are controlled by matrix switcher 33 which is triggered by algorithms from signal analyzer 8 over link 36.

FIG. 10B (inset) shows in greater detail how controllers 31 and 32 trigger the addressable antennas and receive signals for the current embodiment. Controller 31, the X axis control and IF antenna signal detector, has, in this example for one pixel cluster 29, four links connecting to antenna elements 24' and 25' in the cluster. To enable reference antenna 24', the matrix switcher sends signal 34 via the X address control and signal 37 via the Y address control. Similarly, to enable the object signal antenna elements 25', the matrix switcher sends signal 35 via the X address control and signal 38 via the Y address control (only one adjacent antenna 25' example shown in FIG. 10B). In sequence, after an antenna is enabled to receive its signal from phase array 5, the IF signal is sent (as in FIGS. 9A and 9B) for each antenna, respectively: from reference antenna 24', via link 24a', passband 24b', and link 24c' to X-axis address control and IF signal detector 31; and similarly for each of the object signal detector antennas 25', via 25a', 25b", and 25c' to X-axis signal detector 31. Thence, illustrated in FIG. 10A, the respective IF signals from detector 31 are sent via matrix switcher 33 on links 24a' and 25a' to phase vector detector 27 which determines the vector difference for transmission on link 28 to signal analyzer 8, and its associated LUT 90 connected via link 91, for IFT object reconstruction, as described for FIG. 9A.

FIG. 10C is a logic flow diagram following the methodology of FIG. 9C, with the additional embodiments described in FIGS. 10A and 10B for addressing individual antenna elements in this invention. This logic flow is repeated for each frequency of interest for color imaging, if required.

Figure 11:
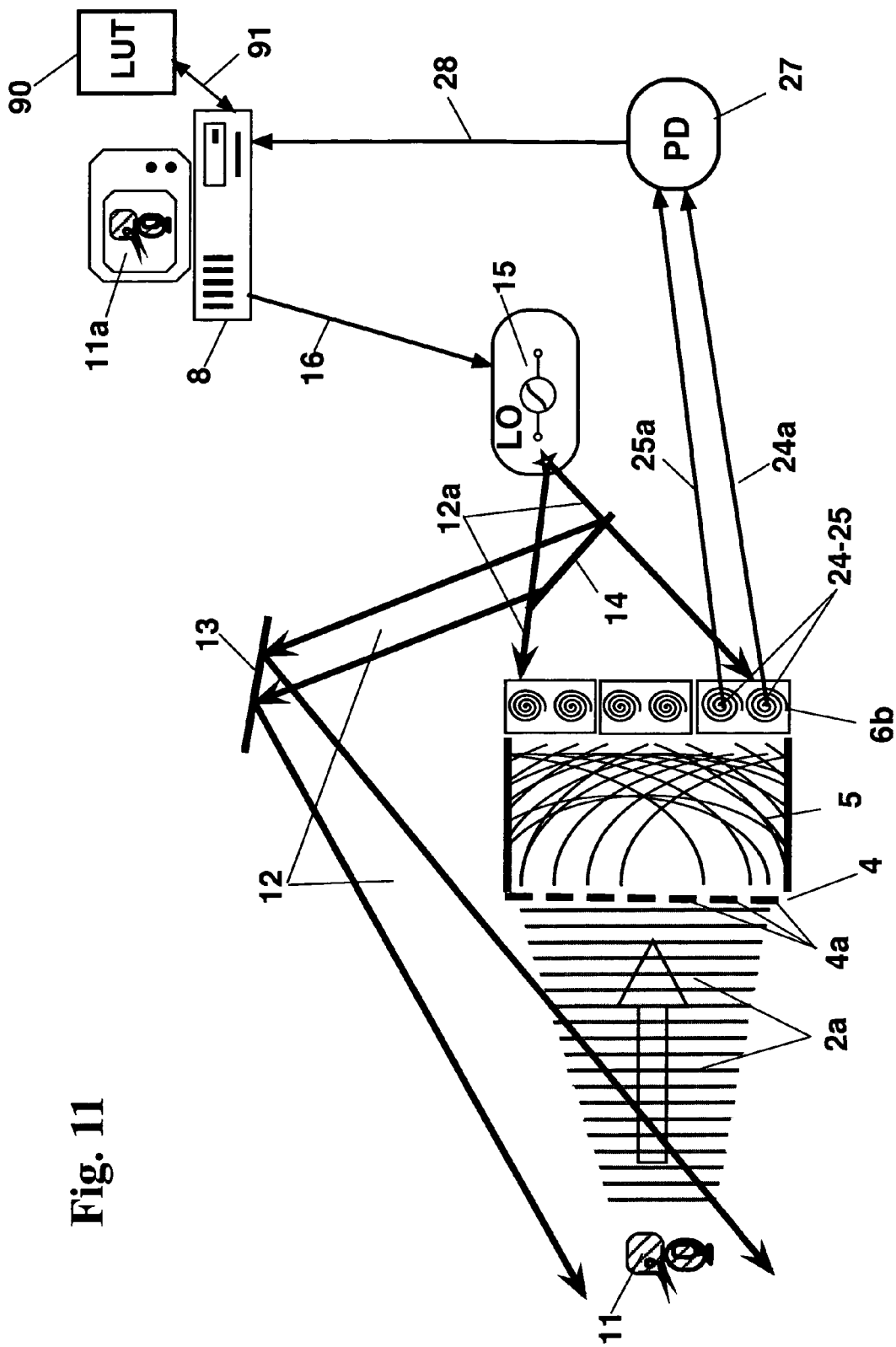
FIG. 11 illustrates one embodiment detecting phase of the wave fronts emanating from a relatively close object irradiated by coherent light.

One embodiment of the invention is illustrated in FIG. 11, constructing image 11a by detecting phase vectors of light field 2a radiating from relatively close object 11 creating phase map 5, following the following methodology and apparatus: Object 11 is irradiated by scanning with coherent light beam 12. Beam 12 originates from LO 15 (an integral part of '680 patent apparatus not shown in full here). As noted, LO 15 is a stepped frequency, highly stable, low-noise coherent reference signal, controlled by signal analyzer 8 via link 16, serving tightly coupled multi-purposes: 1) providing a stable reference beam 12a (as part of the '680 patent apparatus) to array 6b for antenna element heterodyning; 2) means for selecting the frequency of interest for constructing phase map 5 detected by the antennas, e.g. 24 and 25; and, 3) means for providing phase coherent beam 12 identical to beam 12a, from LO 15, for coherent irradiation of object 11. Phase coherent beam 12a is split by half-silvered mirror 14 into beam 12, irradiating object 11 via at least one additional mirror 13; object 11 thence reflects light field 2a irradiating aperture mask 4 creating phase map 5 via diffraction via multiple apertures 4a, as described above. Phase coherent beam 12a also continues through half-silvered mirror 14 to antenna array 6b for heterodyning the received phase map signals to IF, as described for FIG. 8 (applying the '680 patent apparatus and methodology). Links 24a and 25a send IF signals to phase detector 27 used for calculating the phase vector difference between antennas 24 and 25 (as described in more detail for FIGS. 8, 9B and 10B); in addition, link 28 sends the phase difference data to signal analyzer 8, and compensation path delay differences data to LUT 90 via analyzer 8 and link 91 (as described above for FIG. 9A and flow diagram FIG. 9C). Signal analyzer 8 performs phase and spectral frequency analyses using IFT algorithms, following the methodology for FIGS. 8 and 9A and in flow diagram FIG. 9C, to determine the pixel values for reconstructing image 11a for each monochromatic frequency of interest. A full spectrum image is then constructed as discussed above.

Applications for this close object methodology using a coherent irradiation beam include microscopy and macro photography wherein the irradiated distance is limited. One advantage to coherent irradiation in this embodiment is to increase pixel resolution by refining the PSF for IFT signal analysis since there are less spurious out-of-phase wave fronts to analyze, as compared to incoherent irradiation methods. The present invention is differentiated from confocal microscopy due to this invention's EM antenna apparatus and methodology for sensing phase and for depth detection which, in addition, permits chromatic 3D image reconstruction. (Prasad, V, "Confocal microscopy of colloids," *J. Phys.: Condens. Matter,* 2007, v. 19, sect. 4, doi:10.1088/0953-8984/19/11/113,102.)

In a related embodiment to FIG. 11, coherent irradiation of relatively close object 11 is implemented by irradiating the object with a pulsed coherent light beam 12 at the frequency of interest.

In a related embodiment to FIG. 11 (not illustrated), coherent irradiation of relatively close object 11, beam 12 is coupled via fiber optics, or other means, as long as phase coherency of the light wave is maintained among irradiation beams 12, 12a emanating from LO 15.

In a related embodiment to FIG. 11, for a more distant subject irradiated by coherent light (not illustrated), signals received as wave fronts that are below a defined threshold level are recognized by the signal analyzer as too distant to be the subject of interest, and are marked in the IFT database as such. In the IFT reconstruction, the signals representing areas in the scene that are too distant for reconstruction are ignored. These areas may be shown as solid colors, black, or white, or cross-hatched to indicate that details are missing. The wave fronts above the defined threshold show the reconstructed details of the scene.

Figure 12:
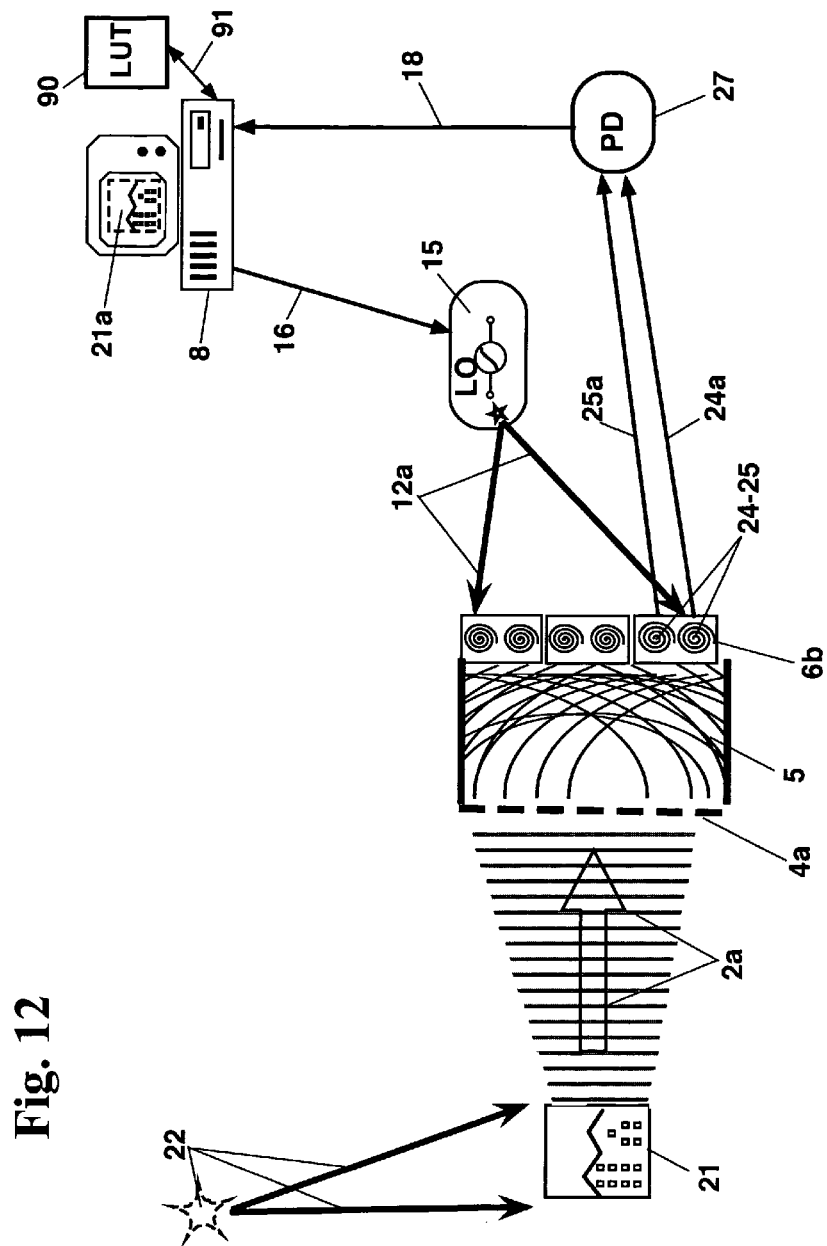
FIG. 12 illustrates one embodiment detecting phase of the wave fronts from an object irradiated by incoherent ambient light; and, FIGS. 13A and 13B illustrate several embodiments to increase resolution and ameliorate various diffraction-related phenomena by rearrangement of the antenna clusters.

In a separate embodiment of the present invention, in FIG. 12 object 21 is shown irradiated by incoherent ambient light 22 for one temporal period (otherwise following the numbered references as in FIG. 11). Light field 2a reflected from object 21 creates phase map 5 for select frequencies of interest. Image 21a is reconstructed following the methodology and apparatus described for FIGS. 8, 9A & 9B, and 10A & 10B.

Figure 13A:
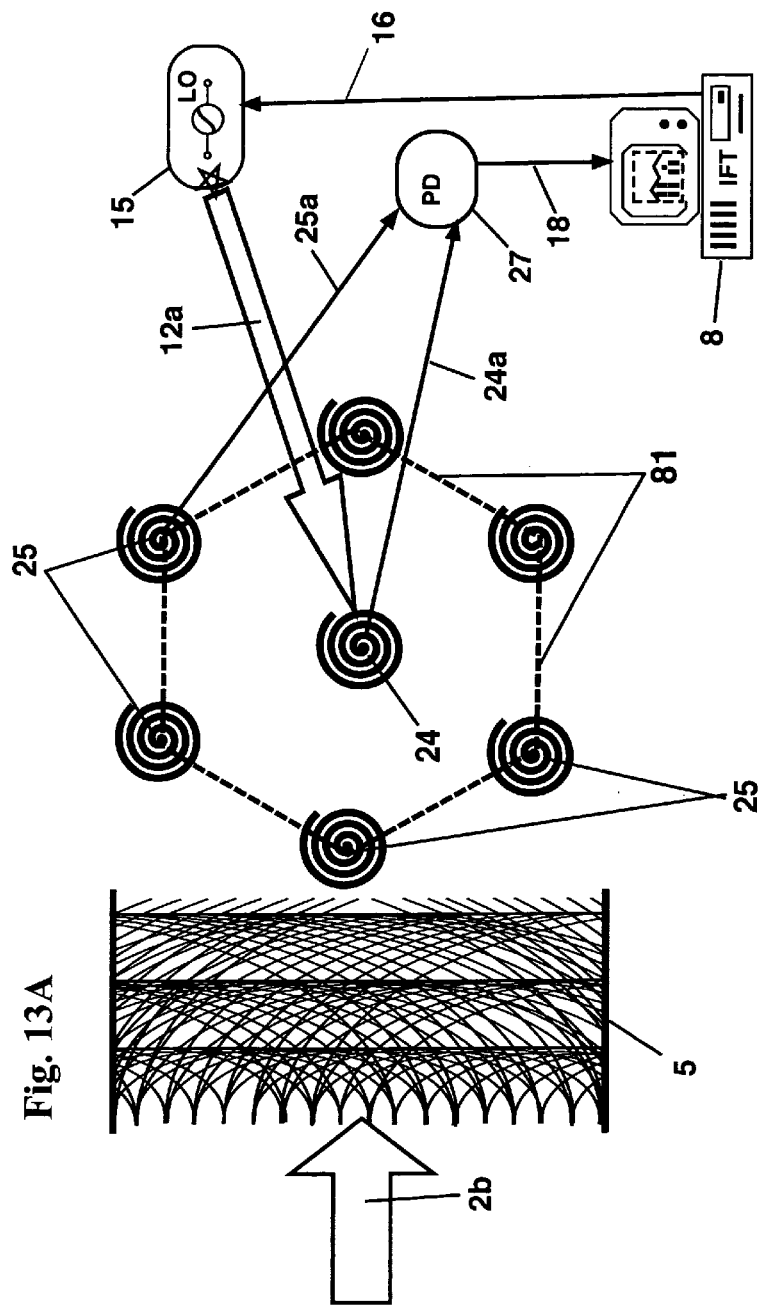
Figure 13B:
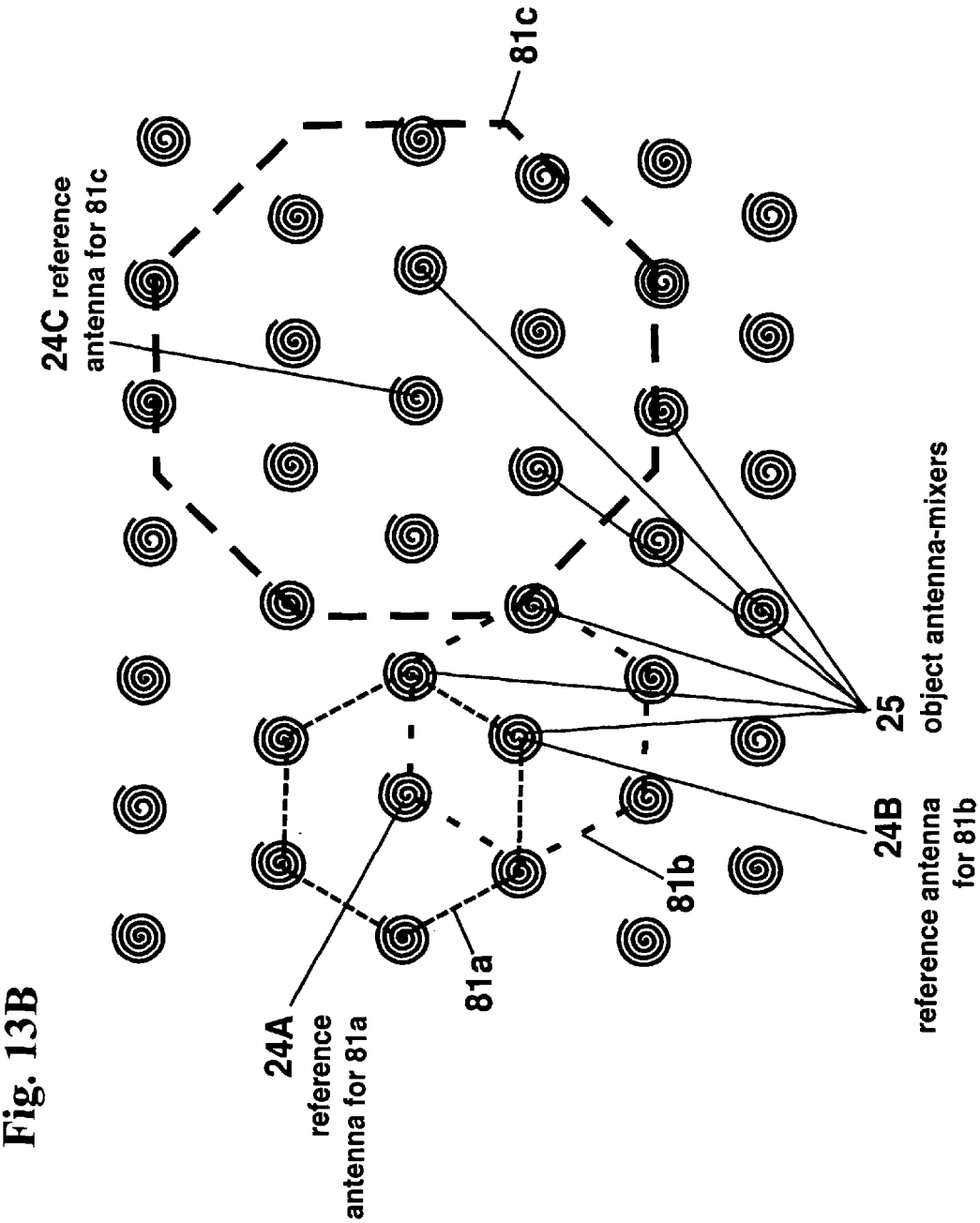

FIGS. 13A and 13B illustrate several methods in this invention that would increase resolution and ameliorate various diffraction-related phenomena. A larger antenna array improves spatial resolution due to synthetic aperture effects affecting the point spread function (PSF) or Fraunhofer function as discussed above.

FIG. 13A illustrates several embodiments of the present invention wherein addressability of the antenna elements enables re-sizing the clusters in the array for purposes of achieving increased resolution. The light field 2b from an object irradiated by either ambient or coherent light creates phase map 5 (as per the methodology described for FIGS. 8, 9A and 10A above; specific details not shown) and impinges multiple patent '680 antennas within a cluster. In this embodiment, six antenna elements 25 (representing one pixel) are arranged in a symmetric hexagonal array in cluster 81, with a seventh antenna element 24, the reference heterodyned to IF, located in the center of the array. Antenna element 24 is excited with stable, low-noise coherent light via beam 12a emanating from LO 15, actuated on link 16 from signal analyzer 8, as per the methodology described above. Simultaneously, LO 15 irradiates (not shown) the six adjacent object signal antennas 25 for heterodyning to IF. The IF reference signal from reference antenna 24 and the average of the IF signals from adjacent antennas 25 are transmitted on links 24a and 25a, respectively (via passband filters if necessary, not shown), to phase vector difference detector 27 for comparison and thence input on link 18 to signal analyzer 8 for imaging as described above.

FIG. 13B illustrates a related embodiment to FIG. 13A where the cluster and antenna geometry are not fixed as in FIG. 13A. The signal analyzer (not shown) addresses each antenna individually, as described for FIG. 10A, with the signal analyzer dynamically selecting which antenna element is the reference and which antenna elements are adjacent, depending on algorithms for different applications. For example, hex cluster 81a is the same as cluster 81 in FIG. 13A, with antenna 24A assigned in this instance to be the reference and adjacent object signal antenna 25 (two elements indicated for this cluster) arranged in a hex pattern around 24A. In another instance illustrated, hex cluster pattern 81b, antenna element 24B is assigned as the reference with one adjacent antenna element 25 indicated for this cluster. Another dynamically assigned octagon cluster pattern 81c is illustrated, with antenna 24C as the reference and four of its fifteen adjacent antennas 25 indicated—eight on the octagon perimeter and seven inside the octagon.

In a related embodiment of the present invention (not illustrated), to increase resolution for the methodology illustrated in FIGS. 13A and 13B the point spread function geometry can be narrowed by increasing the speed of the signal analyzer for IFT convolution. If the phase vector signals are detected with a faster signal analyzer, the vector phase delay detected between the reference and the adjacent antennas can be shorter, thereby narrowing the virtual PSF. Hence, imaging resolution can be improved by replacing only the signal analyzer and its linkages, leaving the sensor apparatus the same.

In FIGS. 8, 9A and 10A, we show an aperture array 4. In one embodiment, the aperture array is implemented as a plate into which an array of holes is formed. In a related embodiment of the present invention (not illustrated), the aperture array is implemented by using liquid crystal display (LCD) technology as known in the art; the technology is used to create a virtual aperture array. The virtual array is formed by providing an array of individually addressable liquid crystal elements over a transparent substrate. The array elements are powered in such a way as to create the aperture array; specifically each aperture in the array corresponds to a set of adjacent aperture elements (the set includes at least one member) that have been powered so as to be light-transmissive. The set of elements is surrounded by other elements that are powered so as to block light. (Because some liquid crystal elements become transmissive when a current is supplied and other liquid crystal elements become light-blocking when a current is supplied, we use the term "powered" to refer to either type of element configured so as to achieve the stated result.) In this manner suitably powering the addressable liquid crystal elements creates the entire virtual aperture array.

Because the liquid crystal elements are addressable, the pattern in the aperture array can be modified to suit current conditions or applications; thus, the size, shape, and spacing of holes in the virtual array can be modified, and so can the general pattern of holes also be modified. Moreover, the modification may be implemented dynamically. This embodiment would enable different imaging resolutions and aberration-ameliorating functions to be performed dynamically for different applications.

In a related embodiment the virtual aperture array is formed by providing an array of individually addressable liquid crystal on silicon (LCOS) technology. The virtual array is formed by providing an array of individually addressable LCOS elements over a transparent substrate, as above. HOLOEYE Corporation Part No. HED-6001 is an example of an LCOS microdisplay device, 3132 Tiger Run Court, Suite 112, Carlsbad, Calif. 92010.

In other embodiments, the phase map data may not necessarily be used to display or store an image; amplitude, frequency and phase data, Fourier transforms or other algorithms may be used for critical meta-information analysis of an object or scene, or portion of an object or scene. For example, as is known in the art, phase contrast information from a microscopic sample may be sufficient for determining certain characteristics of a sample (Zernike F, "Phase contrast, a new method for the microscopic observation of transparent objects," *Physica*, 1942, v. 9, pp. 686-98; Parrent, op. cit., p. 333, and ch. 35 "Phase Contrast Imaging"; and Born, op. cit, pp. 424-428). However, in this invention it is not necessary to generate an image to be viewed to collect such information about a sample. The delay of a phase, measured by its vector angle or difference compared to a reference signal, can also be used for phase analysis imaging; in this case, generating an image with this invention delineated by false coloring or other means.

What is claimed is:

1. A lensless imaging system comprising:

an aperture array having a first side exposed to a scene to be imaged, and having a second side from which is provided an output representative of original frequency components of electromagnetic energy from the scene and local phase differences of electromagnetic energy from the scene;

a planar array, of individually addressable antenna elements, that is disposed to receive the output from the aperture array;

a local oscillator providing a reference frequency output incident on the planar array so as to create a heterodyne difference signal between the reference frequency and each original frequency component present at each of the antenna elements;

a first passband filter coupled to a first selected set of adjacent antenna elements, corresponding to a phase reference, of a cluster in the planar array to provide a first intermediate frequency output for the first selected set of adjacent antenna elements;

wherein (i) the reference frequency has been selected to cause the intermediate frequency output to correspond to a selected frequency sub-band of the original frequency components and (ii) the cluster corresponds to a pixel in an image of the scene;

a second passband filter coupled to a second selected set of adjacent antenna elements of the cluster in the planar array to provide a second intermediate frequency output for the second selected set of adjacent antenna elements;

a phase detector having first and second inputs coupled to the first and second intermediate frequency outputs respectively and having an output representative of the difference in phase of each original frequency component, within the selected frequency sub-band, present in the first set of elements and present in the second set of elements in the cluster; and a signal analyzer coupled to the phase detector output to determine an amplitude value associated with the cluster and therefore of the corresponding pixel in the image of the scene.

2. A lensless imaging system according to claim 1, further comprising:
   an antenna element selector, coupled to the planar array, that selects first and second sets of adjacent antenna elements and provides a first output from the first set of adjacent antenna elements and a second output from the second set of adjacent antenna elements;
   an antenna selector controller, coupled to the antenna element selector to cause the selector systematically to select first and second sets of adjacent antenna elements that, in a series of element selections, collectively include substantially all of the elements;
   wherein the first and second passband filters are coupled to the first and second outputs of the antenna element selector; and
   wherein the signal analyzer is configured to determine amplitude values associated with a series of regions that collectively correspond to a frame of substantially all of the elements within the selected frequency sub-band.

3. A lensless imaging system according to claim 2, further comprising:
   a local oscillator controller, coupled to the local oscillator, to cause the reference frequency to step through a series of incremental changes corresponding to sub-bands of the original frequency components within an imaging bandwidth of interest; and
   wherein the signal analyzer is configured to determine amplitude values for a series of frames, with each frame corresponding to a distinct reference frequency, and is further configured to provide image data for a composite frame wherein for each location of the first and second sets of antenna elements, there is provided an amplitude value for each one of the sub-bands over the imaging bandwidth of interest over substantially the entire array.

4. A lensless imaging system according to claim 2, wherein the signal analyzer is further configured to adjust for differences in path length, and therefore transit time, between each antenna element and a selected one of the phase detectors.

* * * * *